Dec. 27, 1966   S. S. CHARSCHAN ET AL   3,294,670
APPARATUS FOR PROCESSING MATERIALS IN A CONTROLLED ATMOSPHERE
Filed Oct. 7, 1963   10 Sheets-Sheet 1
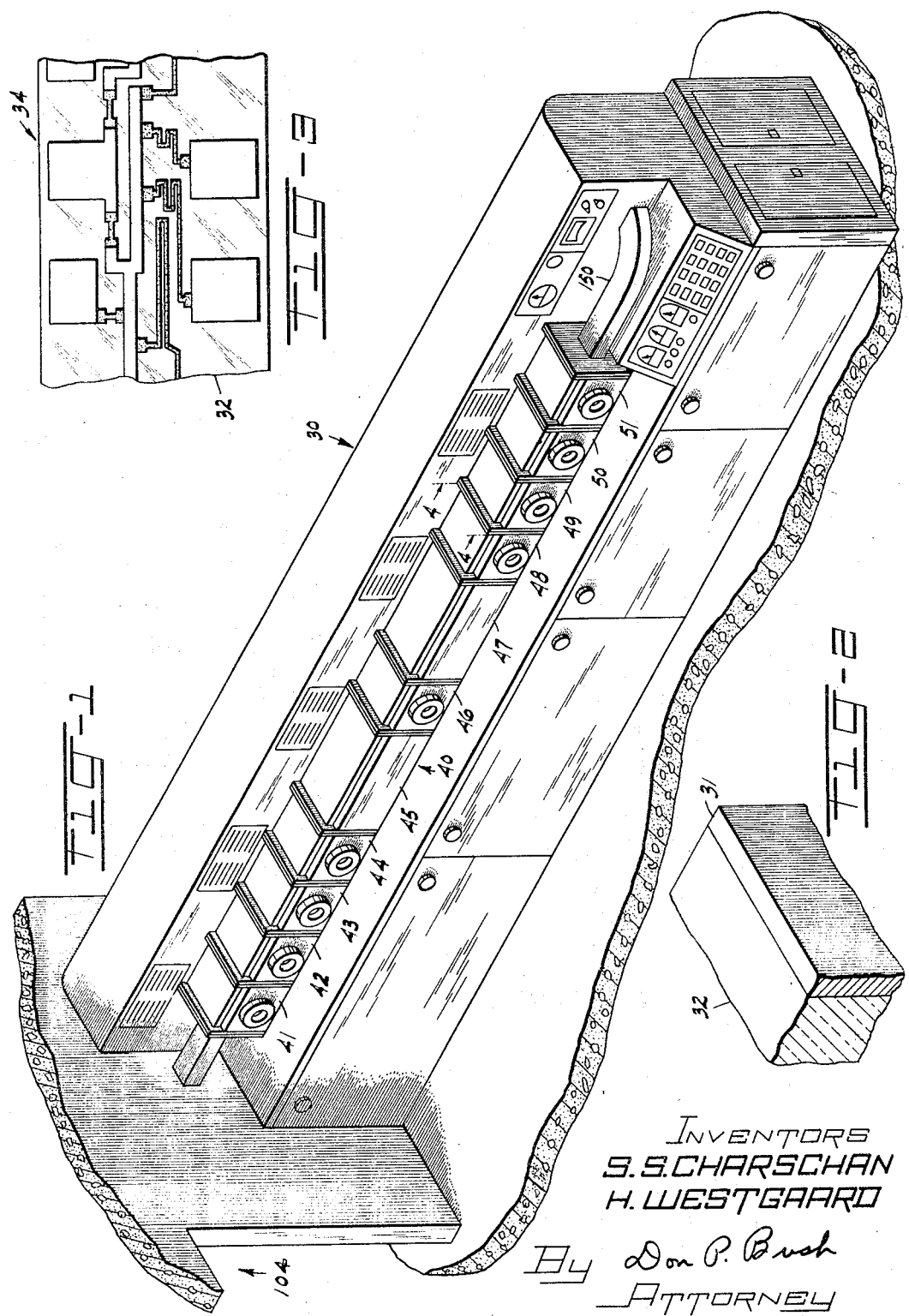
INVENTORS
S. S. CHARSCHAN
H. WESTGAARD
By Don P. Bush
ATTORNEY

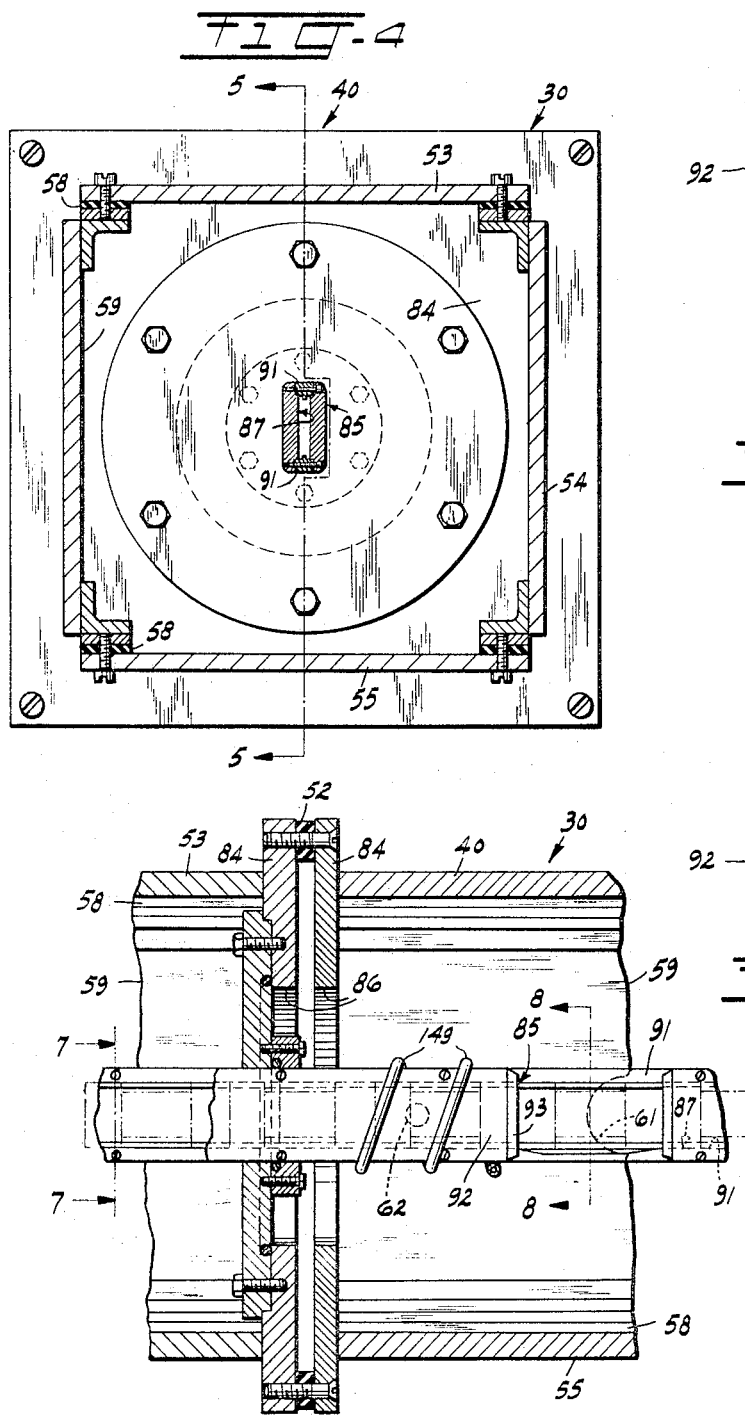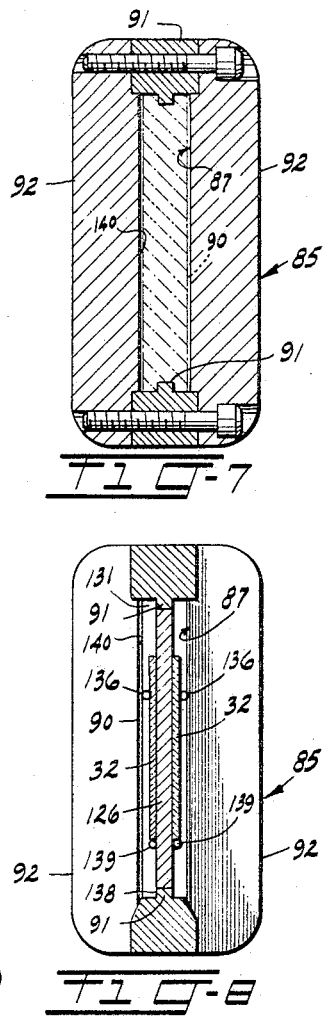

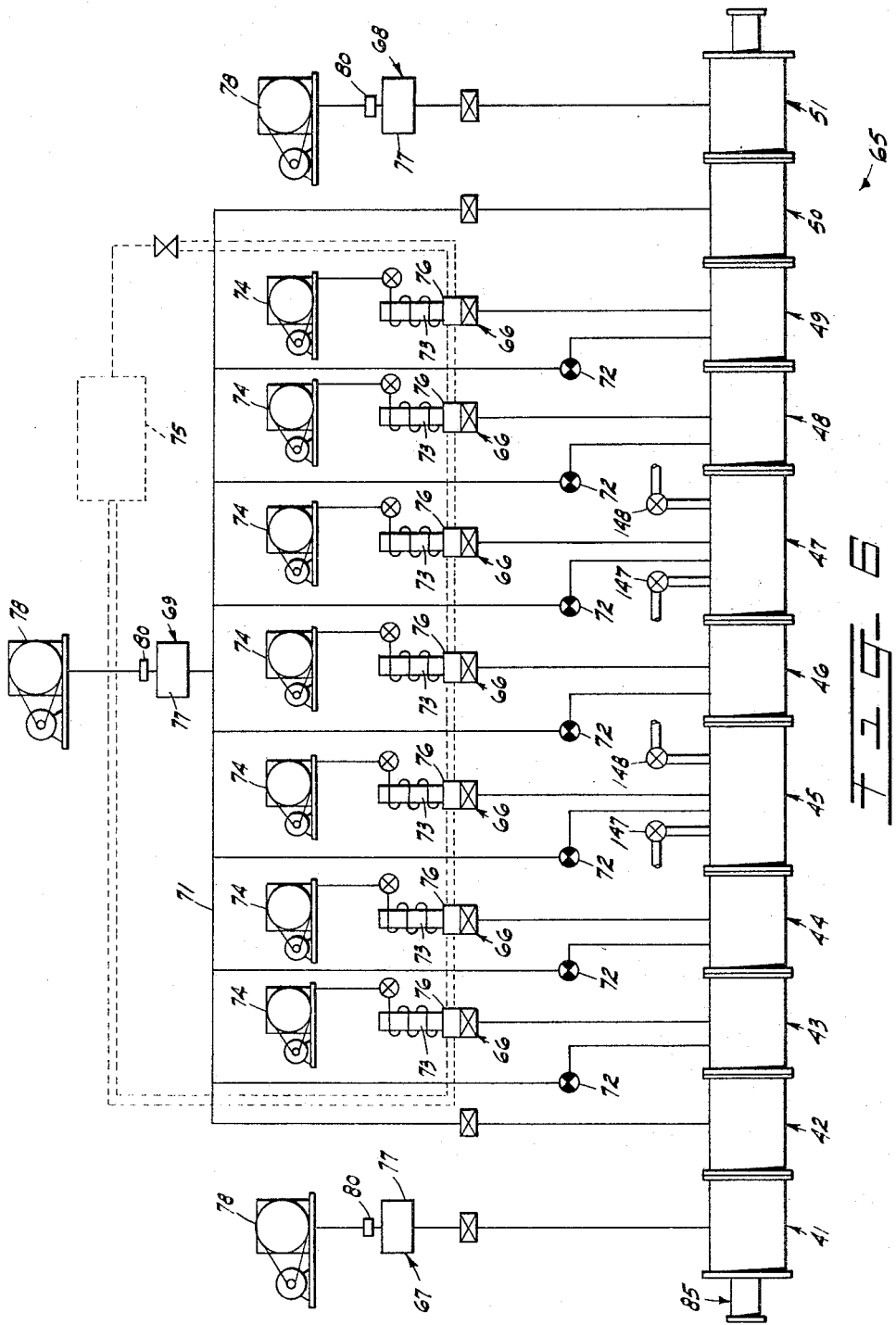

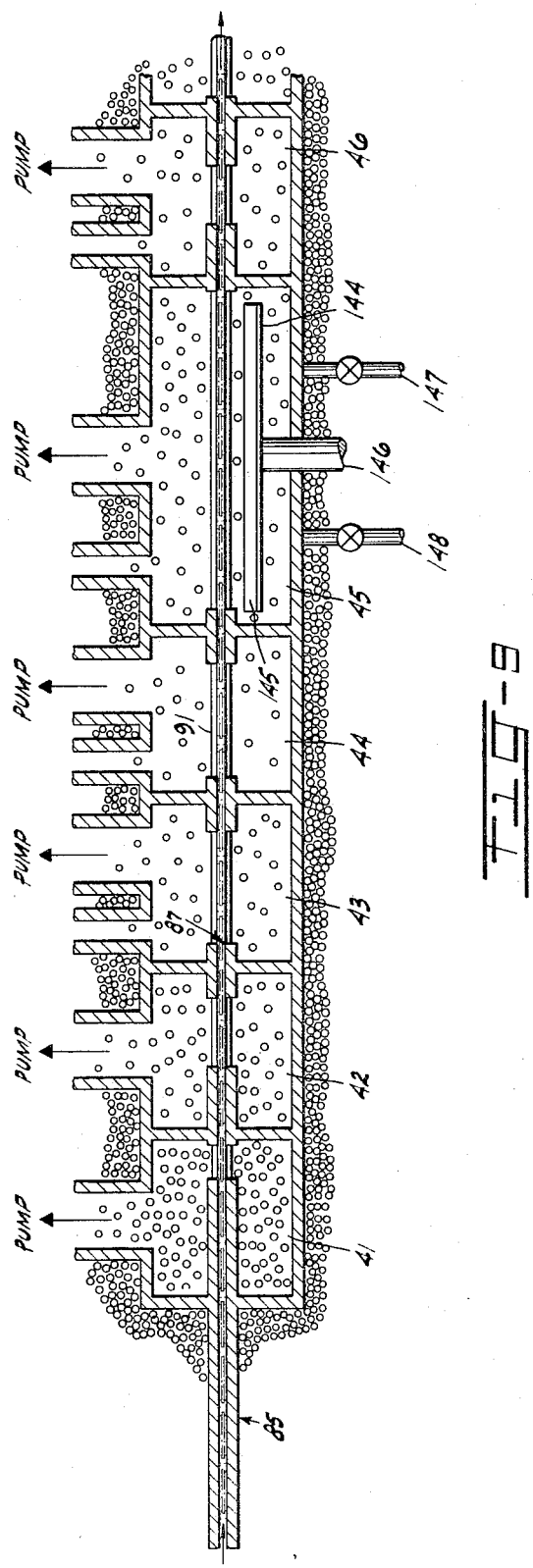

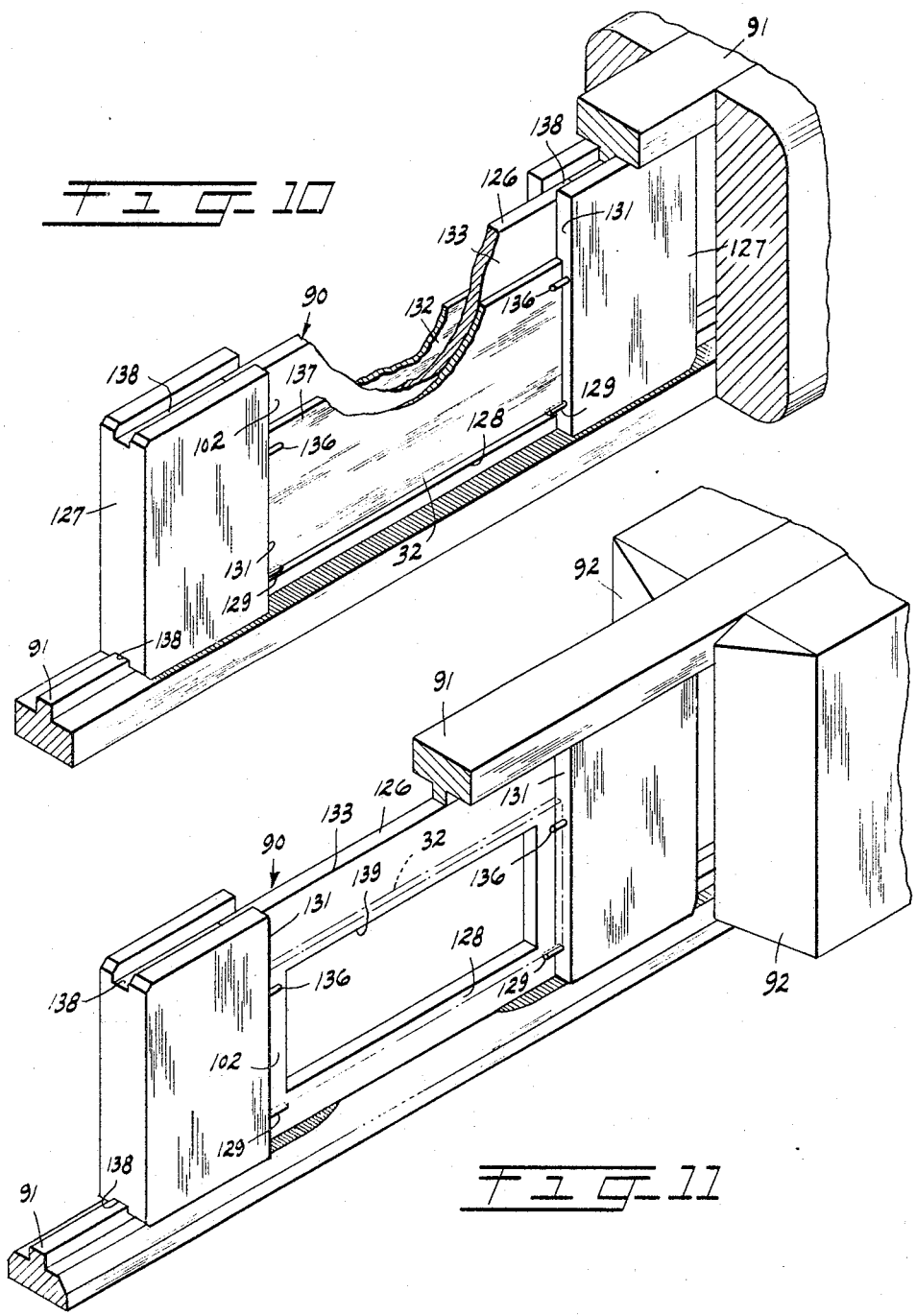

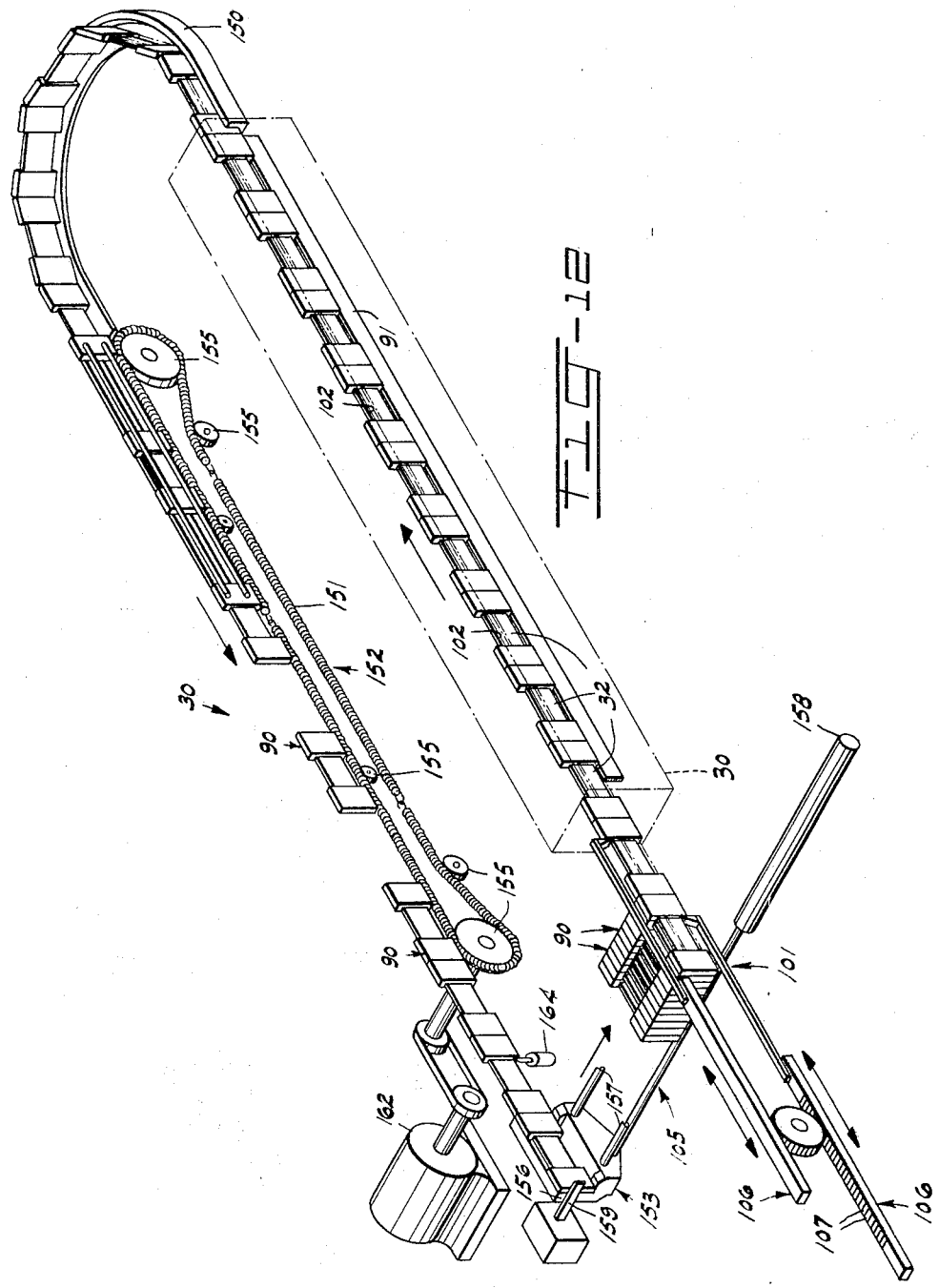

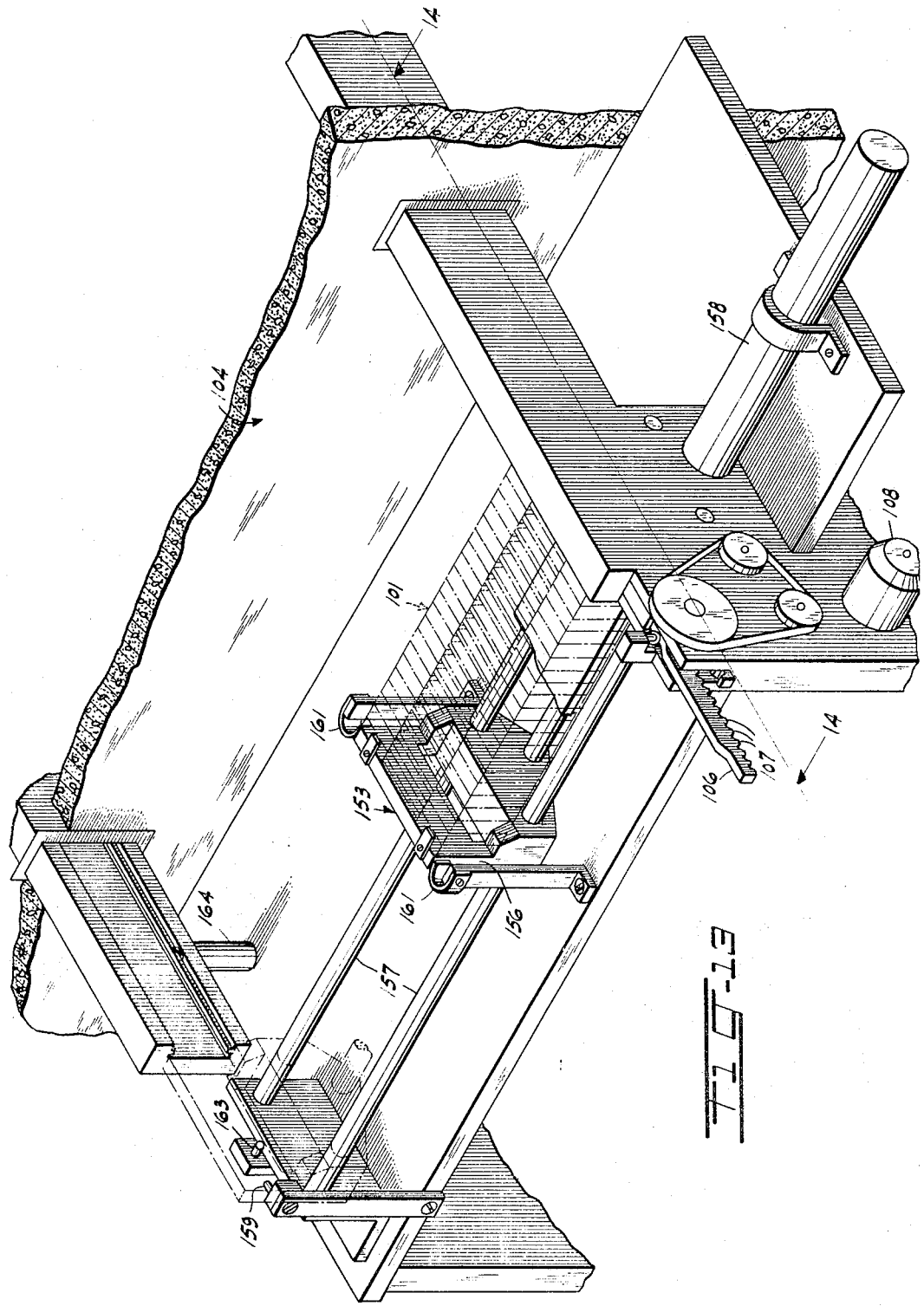

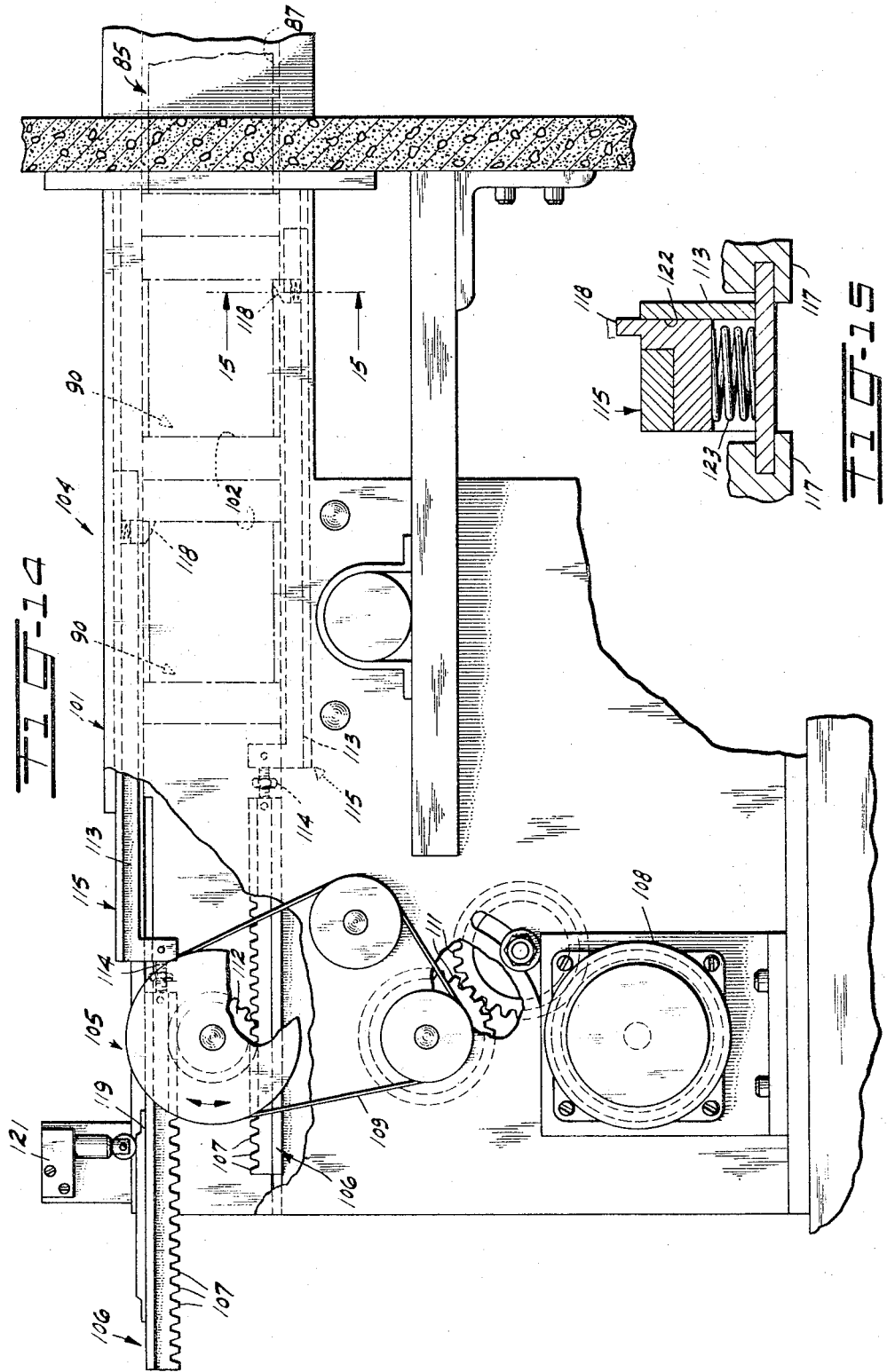

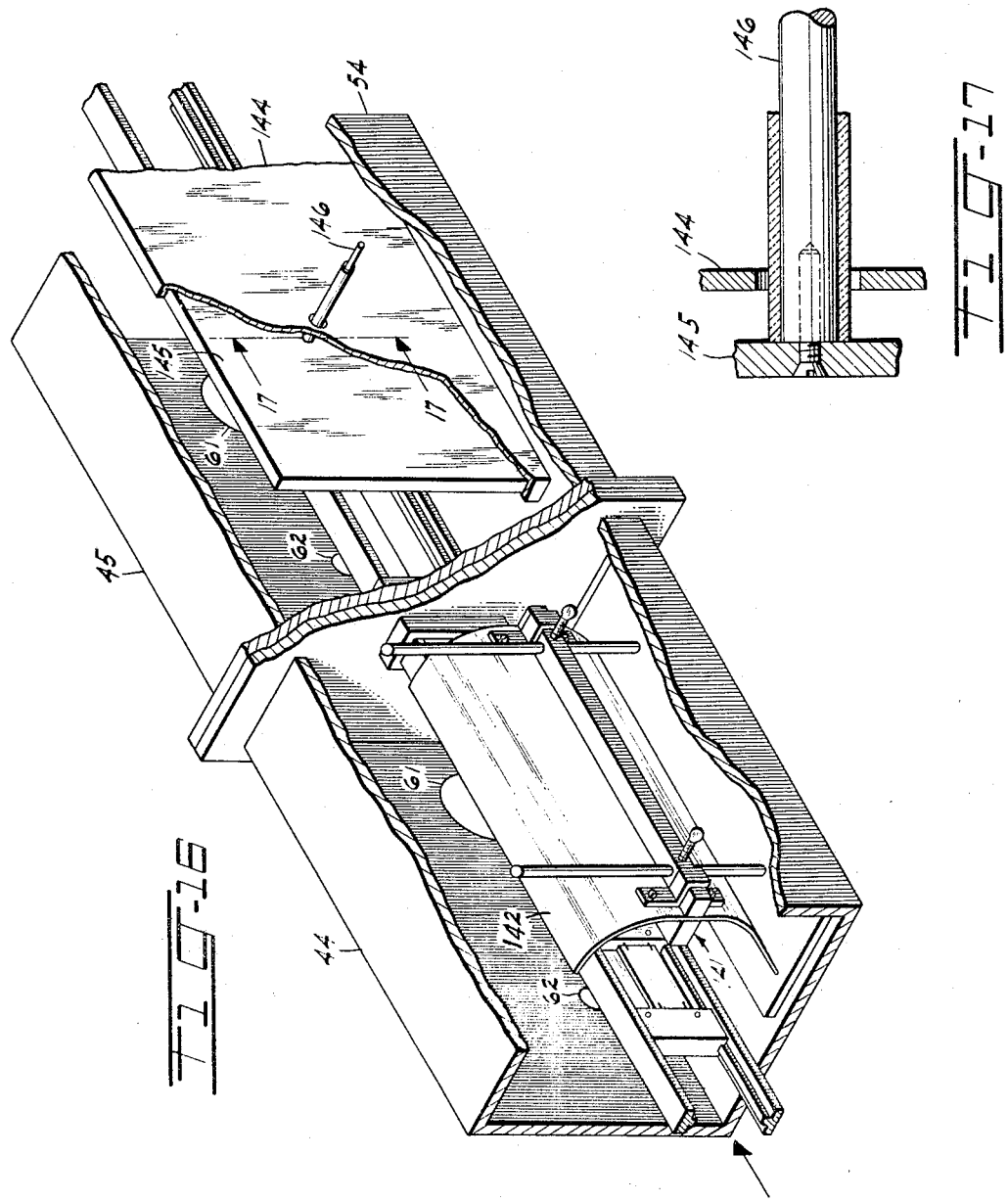

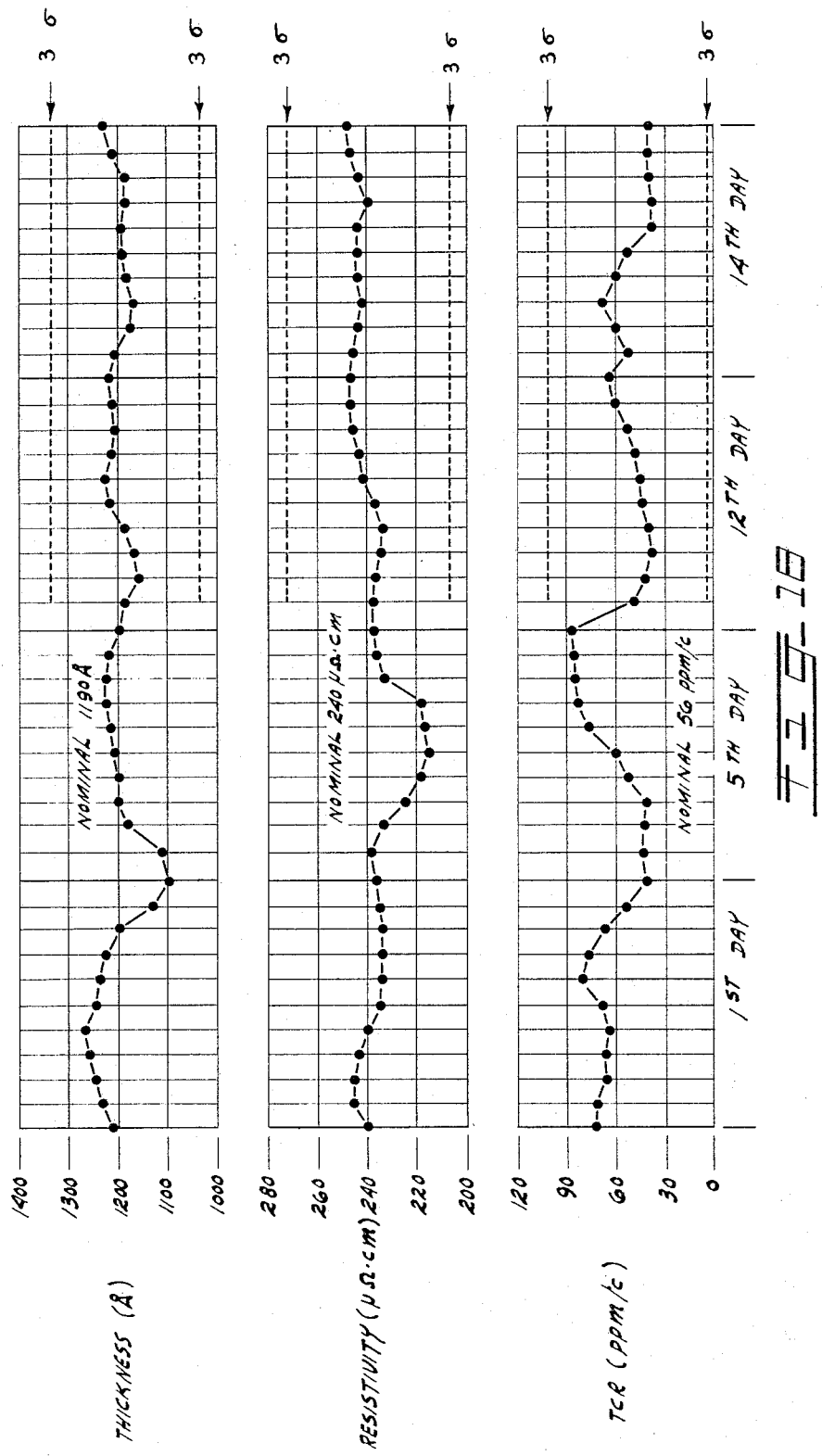

United States Patent Office 3,294,670
Patented Dec. 27, 1966

3,294,670
APPARATUS FOR PROCESSING MATERIALS
IN A CONTROLLED ATMOSPHERE
Sidney S. Charschan, Levittown, Pa., and Harald Westgaard, Lawrenceville, N.J., assignors to Western Electric Company, Incorporated, New York, N.Y., a corporation of New York
Filed Oct. 7, 1963, Ser. No. 314,412
13 Claims. (Cl. 204—298)

The present invention relates to apparatus for processing materials at predetermined pressures on a continuous basis. The invention relates more particularly, although not exclusively, to apparatus for vacuum processing material or preformed articles in an open-ended, in-line process.

In an attempt to provide vast quantities of new, improved and more reliable miniaturized components for use in modern telephone switching systems at reduced costs, the communications industry has made advancements in electronics circuit technology which make it possible to design and fabricate reliable, stable, integrated, passive, virtually two-dimensional circuits termed thin-film circuits, to replace conventional resistor and capacitor circuits. The integrated thin-film circuit includes a thin layer of an appropriate metal, having a thickness of approximately one-millionth of an inch, deposited on a flat, inorganic substrate sheet made of glass or glazed ceramic. Part of the film is later etched away or otherwise treated to form an integrated thin-film circuit including resistors, capacitors and interconnected circuit paths.

Although many metals may be used for forming thin-film circuitry, tantalum is used preferably because tantalum can be anodized under controlled electro-chemical conditions to form a thin, outer oxide layer of tantalum which gives tantalum the reputation of being essentially inert. The outer oxide layer binds so tightly to the remaining portion of the tantalum that the tantalum films are relatively stable, corrosion resistant and abrasion resistant. Controlled oxidation of the tantalum thin film can be used to increase the oxide layer of tantalum, reduce the thickness of the nonoxidized layer of tantalum and change the electrical resistance of the thin-film circuit, thus permitting adjustment of resistors to exact values. Since the tantalum oxide is a relatively good dielectric, it has high breakdown strength and good insulation resistance and can also be used to form the dielectric of a capacitor. In this way, resistors and capacitors in the integrated circuits may be made from one metal alone, although connecting circuit paths may be given an additional metal overlay, such as gold, to improve conductivity and/or to facilitate external connections.

None of these process steps, which transform tantalum films to finished circuits, presents serious production problems if stable and uniform layers of high-purity tantalum are deposited on the substrate sheets; however, a difficult step in the process of making tantalum thin films is the deposition of the basic tantalum layer on the substrate. Thin films of metal may be deposited on a base material by vacuum processes such as vapor deposition and cathode sputtering. In the vapor or distillation coating process, the metal to be deposited is evaporated by heating the metal in a high vacuum. The vapor drifts onto the substrate, where it condenses and forms a film. In sputtering processes, a plate of the metal, to be deposited, is used as an electrical cathode. The cathode and a substrate are placed adjacent to each other in a sputtering chamber. After the sputtering chamber has been evacuated, a suitable inert gas, such as argon, is introduced into the sputtering chamber. A relatively high voltage is applied to the cathode so that the inert gas entering the chamber is ionized, and positive gas ions bombard the cathode. The ionized atoms of inert gas strike the metal with sufficient energy to knock out atoms or clusters of atoms of the coating material from the surface of the cathode which are then deposited on the substrate.

From a practical standpoint, it is believed that the sputtering of the tantalum in a glow discharge is a necessary way of forming thin films of tantalum on substrates for use in integrated thin-film circuits, not only because tantalum has such a high vaporization temperature that other methods would be difficult, but because sputtering processes produce a more adherent film and will permit the advantageous introduction of small amounts of reactive gases, such as nitrogen, into the argon glow discharge contained in the sputtering chamber. The nitrogen combines with some of the tantalum, and the resulting resistive films have been found to be extremely stable. However, the purity of the tantalum and the exact amounts of the nitrogen must be precisely controlled.

While sputtering itself is a good process for depositing tantalum films, the conventional technique of sputtering thin films of tantalum on substrate sheets inside bell jars, which was previously considered the only successful way of sputtering tantalum thin films, has definite limitations in mass production. In the case of tantalum, which deposits slowly in comparsion with metals such as gold, two to three hours in usually required for the complete process of loading the substrates, closing the jar, pumping the jar down to the proper pressure, heating and outgassing (or purifying) the substrates, sputtering the tantalum, cooling the tantalum-coated substrates, reopening the jar and removing the coated substrates. The operation is time consuming and limited to the capacity of the bell jar. Furthermore, product uniformity changes in each bell jar and from one bell jar to another, thus seriously complicating manufacturing process controls. Each opening of the bell jar provides another opportunity for the internal surfaces of the bell jar and the associated equipment to be contaminated by the absorption of oxygen and other contaminants. Accordingly, even though tantalum thin films can be used to make superior integrated circuits, the problems presented by prior known deposition techniques had to be solved in order to obtain economical, high level production of vast quantities of stable thin-film circuits having uniform properties as required by the communication industry.

If conventional bell jar methods and apparatus are used to produce thin films on substrates, the thickness, stability and electrical properties of the coating vary. The importance of the stability, uniformity and reproducibility of the film in the initial sputtering process may not be intuitively obvious when considered alone. However, when the initial sputtering process is followed by many subsequent processes, the operating conditions of which are sensitive to changes in the quality of the input material, then the degree of reproducibility of the initial process becomes significant. Otherwise, compensation for variability of the initial supttered film may significantly influence the complexity and design of some of the subsequent processes and, thus, the manufacturing costs of such thin-film circuits.

When the finished product is used in a complex communications system having millions of different circuits which may be interconnected in millions of different ways, the uniformity of the properties of the individual components have a significant effect on the quality of the signals or messages transmitted by such a system. It is, therefore, obvious that nonuniformity of the thickness and properties of the thin films is harmful in communications systems because nonuniformity introduces unreliability and instability in transmission characteristics of the circuits and prevents achievement of the desired aims of the communications industry.

In order to provide more reliable products having the desired characteristics, it was considered necessary to conceive and develop more economical and dependable equipment and processes capable of performing high speed, low cost methods of depositing tantalum thin films on inorganic substrates. This resulted in the development of an open-ended, in-line vacuum system embodying certain principles of the present invention.

The in-line, open-ended apparatus embodying principles of the present invention permits simultaneous performance of all of the operations required in batch-type processes. The processing takes place uninterruptedly in a series of processing chambers maintained at constant pressures and environmental conditions while substrate sheets are moved continuously into, through and out of the series of chambers through calibrated leaks having uniform cross sections. The costly and time consuming repeated outgassing of the sputtering chamber which is inherent in batch-type operations is eliminated. An intermediate chamber used for sputtering is outgassed once and kept under identical vacuum and environmental conditions at all times while predeposition outgassing of the substrate sheets takes place in auxiliary chambers removed from the deposition chamber. The stable conditions maintained in the sputtering chamber insure uniform deposition of pure tantalum on an unlimited number of substrate sheets because all production steps are being performed on successive substrate sheets at the same time.

Various open-ended, vacuum-processing machines, consisting of a plurality of interconnected chambers through which strips or strands of material or preformed articles are fed to treat or process the materials or articles, are disclosed in the prior art. Most of these machines depend on the dimensional tolerances of the material or articles to control the leakage rate of gases into the various chambers. However, it is believed that none of the previously known open-ended, vacuum-processing machines have the degree of control of the leakage between interconnected chambers which can be achieved by apparatus embodying principles of the present invention. Accordingly, none of the prior known open-ended, vacuum-processing machines or methods are believed to be capable of the high degree of control of the operating conditions of the vacuum-processing machine required for sputtering thin films of tantalum on insulating substrate sheets to produce thin-film integrated circuits possessing the desired physical and electrical characteristics required for use in sophisticated communications systems.

It is an object of the present invention to provide new and improved continuously operating, material-treating apparatus.

It is another object of the present invention to provide new and improved apparatus for coating materials on a continuous basis in a controlled atmosphere.

It is a further object of the present invention to provide new and improved apparatus for vacuum processing of parts or materials in accurately controlled atmospheres at predetermined pressures.

Another object of the present invention is to provide new and improved apparatus for treating parts or material continuously wherein a plurality of chambers are interconnected with each other and the outside atmosphere by openings through which the material passes from ambient atmosphere through the successive chambers, maintained at predetermined pressures and environmental conditions, and back to the ambient atmosphere without interfering with the maintenance of desired pressures and environmental conditions in the chambers.

A still further object of the present invention is to provide new and improved apparatus for sputtering thin films of tantalum on substrates in accurately controlled atmosphere at predetermined pressures by utilizing a series of processing chambers which communicate with each other and ambient atmosphere through uniform calculated clearances, which clearances are sufficiently large to permit free passage of materials through the chamber without physically or chemically interfering with the satisfactory operation of the sputtering process.

An open-ended, continuous processing apparatus, embodying certain features of the present invention may include an elongated, open-ended, apertured channel extending longitudinally through the apparatus, the channel defining a passage through which material to be processed enters the apparatus from ambient atmosphere, passes through the apparatus, and exits into ambient atmosphere. A plurality of interconnected, open-ended chambers may support the channel. The individual chambers surround apertured portions of the channel and contain processing atmospheres to which the material in the channel is exposed through the apertures therein. Means are connected to the chambers for maintaining predetermined pressures in the processing atmospheres in the chambers. Guide means extend along the inside surface of the channel and are used to support a plurality of identically shaped carriers for conveying the material to be treated through the apparatus. The carriers have portions projecting transversely outwardly beyond the entire outer peripheries of the material supported by the carriers. Segments of the projecting portions of the carriers are complementary in shape to the guide means and cooperate with the guide means to align the carriers axially and accurately position the carriers in the channel. The axial alignment of the carriers and positioning of the carriers accurately in the channel provide uniform, restricted clearances between the outer peripheries of the enlarged portions of the carriers and internal surfaces of the channel sufficiently large to allow the carriers to move freely through the channel and still provide sufficient resistance to the flow of fluids to and from the chambers to permit predetermined pressures to be maintained in the chambers. Suitable means are also provided for moving the carriers through the channel.

Other objects and features of the present invention will be more readily understood from the following detailed description of a specific embodiment thereof when read in conjunction with the accompanying drawings, in which:

FIG. 1 is a perspective view of a preferred embodiment of a sputtering apparatus embodying certain features of the present invention;

FIG. 2 is an enlarged, fragmentary, perspective view of a piece of a ceramic or glass substrate sheet covered on one side with a thin film of tantalum sputtered thereon by the apparatus illustrated in FIG. 1;

FIG. 3 is a fragmentary plan view of a group of thin-film resistors formed by processing the tantalum-coated substrate sheet illustrated in FIG. 2;

FIG. 4 is an enlarged vertical cross section of a processing chamber of the apparatus of FIG. 1 taken along line 4—4 thereof;

FIG. 5 is a sectional view of the processing chamber illustrated in FIG. 4 taken along line 5—5 thereof;

FIG. 6 is a schematic view of the pumping system of the apparatus of FIG. 1;

FIGS. 7 and 8 are enlarged sectional views of an open-ended guide channel designed for supporting carriers being pushed through the apparatus of FIG. 1, as taken along lines 7—7 and 8—8, respectively, of FIG. 5;

FIG. 9 is a diagrammatic view illustrating various atmospheric pressures in and around the apparatus of FIG. 1 and calculated clearances forming leakage paths to and from the open-ended processing chambers of the apparatus of FIG. 1;

FIGS. 10 and 11 are enlarged, perspective views of the guide channel of the apparatus of FIG. 1 with various types of carriers supported therein;

FIG. 12 is a schematic view of feed and return mechanisms of the apparatus of FIG. 1 with portions thereof broken away for purposes of clarity;

FIG. 13 is an enlarged, perspective view of the feed mechanism at the entrance end of the apparatus of FIG. 1;

FIG. 14 is an enlarged, side-elevational view of the feed mechanism of FIG. 13;

FIG. 15 is an enlarged sectional view of a hitch feed of the feed mechanism of FIG. 14 taken along line 15—15 thereof;

FIG. 16 is an enlarged, perspective view of a preheating and outgassing chamber and interconnected sputtering chamber of the apparatus of FIG. 1 with portions broken away for purposes of clarity;

FIG. 17 is an enlarged sectional view of a feedthrough for applying power to the cathode in the sputtering chamber of FIG. 16, taken along line 17—17 thereof; and FIG. 18 is a series of charts illustrating various characteristics of thin films produced with the apparatus illustrated in FIG. 1.

Referring now to the drawings and more particularly to FIG. 1 thereof, there is shown a continuously operating vacuum-processing apparatus, designated generally by the numeral 30. The apparatus 30 is open at both ends to ambient atmosphere to permit ready entrance and exit of materials into and out of noncontaminated environments in the apparatus without affecting the operating stability of the apparatus. The apparatus 30 is capable of being used for mass production sputtering of consistently high quality, extremely thin films 31—31 (FIG. 2) of tantalum on insulating substrate material, such as alkaline-free glass or glazed-alumina ceramic substrate sheets 32—32, on a continuous basis. The apparatus 30 is constructed so that variations in dimensional tolerances of the substrate material 32 will not affect the uniformity of the pressures and atmospheric conditions in the apparatus and, thus, affect the uniformity and reproducibility of permanently adhering, high-purity, thin films of tantalum 31—31 capable of being used to form low cost, thin-film circuit components 34—34 (FIG. 3).

The apparatus 30 includes a multichambered enclosure, designated generally by the numeral 40. Although the design of the product and processing control required dictate the size and number of chambers in which the enclosure 40 is divided, the preferred embodiment of the apparatus 30, which permits a mass production line of the substrate sheets 32—32 to move into, through and out of a controlled atmosphere, includes eleven modular, vacuum chambers, designated generally by the numerals 41–51, inclusive. The chambers 41–51, inclusive, are similar in structural design and are accessible from three sides. The chambers 41–51, inclusive, are formed by inert-gas welding of pieces of stainless steel and are sealed to each other in end-to-end engagement with molded rubber gaskets 52—52 (FIG. 5). Nine of the chambers 41 to 44, inclusive, 46, and 48 to 51, inclusive, are each 12 by 12 by 15 inches and are used for auxiliary processing. The remaining two chambers 45 and 47, are each 12 by 12 by 30 inches and are used for sputtering materials on the substrate sheets 32—32. The chamber 45 is used for sputtering tantalum on the substrate sheets 32—32, and chamber 47 may be used as a spare sputtering chamber for tantalum or may be used for depositing gold or some other material for circuit paths.

The top, front and bottom (FIG. 4) of each of the chambers 41 to 51, inclusive, are in the form of cover plates 53, 54 and 55 and are removable to permit free access to the chambers for the installation and maintenance of processing fixtures. The cover plates 53, 54 and 55 serve as mounting plates for various processing fixtures. Thus, the various fixtures can be set up on the plates 53, 54 and 55 and tested in ambient or controlled atmospheres prior to being installed in the chambers. Feedthroughs for electrical power, thermocouples, cooling water, gauging, etc., are also brought through these plates 53, 54 and 55. As in the case of the interconnections between chambers, the cover plates 53, 54 and 55 are sealed to remaining portions of the chambers 41 to 51, inclusive, with special molded gaskets 58—58 (FIG. 4).

The backs 59—59 of the chambers 41 to 51, inclusive, are formed integrally with the frame of the individual chambers and have 4-inch diameter high-vacuum ports 61—61 (FIG. 5) and 1½-inch diameter roughing ports 62—62 (FIG. 5) connected to a pumping system, designated generally by the numeral 65, illustrated in FIG. 6. The pumping system 65, is attached to the chambers 41 to 51, inclusive, through the ports 61—61 and 62—62 to control the pressure and condition of the atmosphere contained in the chambers. The pumping system 65 includes seven complete diffusion pumping units, designated generally by the numerals 66—66, and three mechanical booster pumping units, designated generally by the numerals 67, 68 and 69. The diffusion pump units 66—66 are connected individually to the seven middle chambers 43 to 49, inclusive. Two of the mechanical pump units 67 and 68 are connected individually to the end chambers 41 and 51. The remaining mechanical unit 69 is connected to the chambers 42 and 50 through a 4-inch manifold 71. Connections are made from the manifold 71, through roughing valves 72—72 and into the chambers 43 to 49, inclusive, normally pumped by the diffusion pumping units 66—66, thus, providing a high speed roughing system for the apparatus 30.

Each of the diffusion-pump units 66—66 includes a 1500-cubic feet per minute (c.f.m.) diffusion pump 73 backed up by a 15-c.f.m. mechanical pump 74. Separate, optically dense, chevron baffles 76—76, cooled to −40° C. by a refrigeration unit 75, are provided between the diffusion pumps 73—73 and the associated vacuum chambers 43 to 49, inclusive. The chevron baffles 76—76 are used to prevent oil backstreaming from the diffusion pumps 73—73 and to trap condensable vapors present in the pumping system 65.

The mechanical booster pump units 67, 68 and 69 each include a 400-c.f.m. Roots-type mechanical booster 77 backed up by an 80-c.f.m. mechanical pump 78. The booster pumps 77—77 and the mechanical pumps 78—78 are water-cooled to allow continuous operation of the pumps 77—77 and 78—78 at relatively high pressures without overheating. A pressure switch 80 is mounted in the foreline of each of the mechanical units 67, 68 and 69 and protects the associated booster pump 78 in case excessive pressure is developed in the system.

The insides of the chambers 41 to 51, inclusive, are interconnected and in communication with each other through a common, interchangeable, horizontal channel, designated generally by the numeral 85 (FIGS. 4 to 12) positioned in 9-inch apertures 86—86 in the ends of the interconnected chambers (FIG. 5). The channel 85 extends the entire length of the enclosure 40 (FIG. 12) and defines a passage, designated generally by the numeral 87, through which a series of contiguous carriers 90—90 are moved in end-to-end engagement to carry the substrate sheets 32—32 to be coated from one end of the channel 85, which is exposed to the ambient atmosphere, to the other end of the channel 85, which is also exposed to the ambient atmosphere. The channel 85 is formed, in part, of two parallel, accurately machined tracks 91—91 extending the entire length of the series of interconnected chambers 41 to 51, inclusive.

Where the tracks 91—91 pass through the ends of each of the chambers 41 to 51, inclusive, accurately machined, stainless-steel shrouds 92—92 extend along the sides of the tracks 91—91 at spaced intervals. The tracks 91—91 and shrouds 92—92 cooperate to form an intermittent tube which is supported by and sealed to the walls 84—84 in the ends of the individual chambers to define elongated passages of different lengths into and out of each chamber. The lengths of the shrouds 92—92 and, thus, the lengths of the passages formed by the shrouds depend on the differences in the desired pressures between different chambers 41 to 51, inclusive, or between the end chambers 41 and 51 and the ambient atmosphere. The lengths of the interchamber passages are from 5 to 7 inches, and the passages between the end chambers 41 and 51 and ambient atmosphere are approximately 34 inches long.

The spacing between the stainless-steel shrouds 92—92 form apertures 93—93 of predetermined lengths in the sides of the portion of the channel 85 extending through each of the successive chambers 41 to 51, inclusive, to expose the substrate sheets 32—32 and carriers 90—90 passing therethrough to the controlled atmospheres of the associated chambers for predetermined periods of time during the movement of the carriers and substrate sheets through the channel. The apertured portions 93—93 of the channels 85 are chamfered to permit chips from the substrate sheets 32—32, pieces of tantalum film which may flake off the carriers 90—90 or other particles of matter to fall from the channel 85 into the bottom of the chambers 41 to 51, inclusive, and prevent jamming of the carriers in the channel.

It is obvious that the channel 85 could be formed alternatively of a single piece of tubing (not shown) having apertures on one or both sides thereof and having guide tracks projecting from the upper and lower surfaces thereof to position the carriers accurately in the center of the channel.

Because the tantalum films 31—31 deposited on the substrate sheets 32—32 are only approximately 1000 angstrom units thick and must be as continuous and as adherent as possible, it is important that the substrate sheets 32—32 be free of small dust particles, which on the average are approximately 5000 angstrom units in diameter. For this reason, dust free substrate sheets 32—32 are loaded into carriers 90—90 and placed in a magazine, designated generally by the numeral 101, positioned at the entrance to the apparatus 30. The carriers 90—90, each supporting one or more of the uncoated substrate sheets 32—32 on recessed surfaces 102—102 on the carrier, are fed from the magazine 101 (FIG. 12) through the channel 85 at an exact predetermined rate on a continuous basis. The loaded carriers 90—90 are pushed by an automatic feed mechanism (FIGS. 12, 13 and 14), designated generally by the numeral 105, in end-to-end engagement along the tracks 91—91 extending through the apparatus 30. If desired, the magazine 101 may be located in a clean room 104 (FIG. 1) to minimize the possibility of dust particles being on the surfaces of the substrate sheets 32—32.

The feed mechanism 105 includes a pair of parallel, reciprocating gear racks (FIG. 14) designated generally by the numerals 106—106, mounted for reciprocation on opposite sides of the magazine 101, in paths parallel to the longitudinal axis of the channel 85 on opposite sides thereof. The gear racks 106—106, having gear teeth 107—107 on the adjacent sides thereof, are reciprocated by a reversible, electrical motor 108 through a toothed, timing belt 109, a set of change gears 111—111 and a common pinion gear 112, positioned between the gear racks 106—106.

A rod 113 of a hitch feed, designated generally by the numeral 115, is secured adjustably to each of the racks 106—106 by a double-threaded screw 114. The rods 113—113 are mounted slidably in guide tracks 117—117 (FIG. 15) mounted adjacent to the end of the magazine 101 to guide the rods 113—113 parallel to the longitudinal axis of the channel 85 on opposite sides thereof. A spring-biased, reciprocating, tapered latch or pawl 118 is secured on adjacent sides of each of the rods 113—113 and is used to engage recessed portions 102—102 (FIG. 14) of alternate carriers 90—90 in the magazine 101 and to push the string of carriers 90—90 in the channel 85 through the apparatus 30.

The pinion gear 112 is oscillated by the reversible motor 108 to reciprocate the gear racks 106—106 and attached rods 113—113. A cam 119, secured to the upper gear rack 106, controls a limit switch 121 so that when one of the racks 106—106 reaches the end of its forward stroke and the other rack has reached the end of its rearward stroke so that the latch 118 is in the recessed portion 102 of the next carrier 90, the motor 108 is reversed, thus, relieving the force exerted on the string of carriers 90—90 extending the entire length of the apparatus 30. Simultaneously, force is exerted on the next carrier 90 in the magazine 101 and on the string of carriers 90—90 in the channel 85 by the other pawl 118 and associated rod 113 and gear rack 106. As the inactive gear rack 106 is retracted by the pinion gear 112 in preparation for a subsequent feeding operation, the tapered pawl 118 is pushed into a cavity 122 in the rod 113 against the action of a spring 123 and is thus ineffective when traveling in the reverse direction.

The carriers 90—90 are each formed of a relatively thin central web 126 (FIGS. 10 and 11) and two enlarged, hardened, accurately machined end portions 127—127. The thin central web 126 cooperates with the enlarged end portions to form the recesses 102—102 which are each designed to support one of the substrate sheets 32—32, three inches long and up to two inches in height. The substrate sheet 32 is placed in the recessed portion 102 of the carrier 90 vertically so that the substrate sheet 32 is supported on a lower edge 128 by two roll pins 129—129 secured in apertures (not shown) in the adjacent ends 131—131 of the end pieces 127—127 of the carrier 90 with one surface 132 of the substrate sheet 32 engaging the adjacent surface 133 of the web of the carrier 90. The substrate sheet 32 is prevented from falling out of the recessed portion 102 of the carrier 90 by two other roll pins 136—136 projecting from the adjacent surfaces 131—131 of the end pieces 127—127 of the carrier and engaging the exposed surface 137 of the substrate sheet 32. The web 126 of the carrier 90 may be provided with an aperture 139 (FIG. 11) so that both sides of the substrate sheet 32 are exposed to the sputtering process. In that event it may be desirable to utilize the sputtering chamber 47 for sputtering tantalum or some other material on the opposite side of the substrate sheet 32.

The upper and lower surfaces of the end portions 127—127 of the carriers 90—90 are bifurcated by axially extending slots 138—138 formed therein. The bifurcated end portions 127—127 of the carriers 90—90 straddle the complementary-shaped, relatively hard tracks 91—91 to align the carriers axially with respect to each other and center the carriers in the channel 85 so that the carriers will remain equidistant from the walls on the insides of the channel (FIGS. 7 and 8). The axial alignment of the carriers 90—90 and the accurate positioning of the carriers 90—90 within the channel 85 prevent the sides of the carriers from rubbing on the inside surface of the channel 85 and provide a uniform, calculated clearance 140 of 0.005 inch between the outer peripheries of the ends 127—127 of the carriers at the top and sides thereof and the inside surfaces of the walls of the channel 85.

Since the enlarged ends 127—127 extend transversely outwardly beyond the entire outer peripheries of the substrate sheets 32—32, the clearance 140 remains constant and does not vary because of variations in the size of the substrate sheets 32—32 being treated. The clearance 140 does not vary because of misalignment of the carriers 90—90 in the channel 85 or because of shifting of aligned carriers 90—90 from one side of the channel 85 to the other. This arrangement provides minimum clearances required to permit free movement of the carriers 90—90 through the channel 85 and still provides sufficient resistance to the flow of gases through the channel to limit the leakage of gases to and from the chambers 41 to 51, inclusive, to a minimum and, thus, permits required pressures to be maintained in the various chambers. The lengths of the calibrated clearances or leaks 140—140 between the peripheries of the carriers 90—90 and inside surface of the channel 85 in the portions of the passage communicating with the different chambers 41 to 51, inclusive (FIG. 9) are controlled to permit the leakage of gases from the ambient atmosphere and between chambers to be determined and controlled accurately. This eliminates the need for providing hermetic seals and the inherent disadvantages resulting from the use of such seals.

Contrary to vapor deposition processes, sputtering is a high-energy process. The impact energy of the gas ions on a cathode removes metal atoms which are deposited on other surfaces. Gas ions and electrons also bombard the surfaces of the substrate material and all of the exposed walls and elements in the sputtering chamber. This bombarding produces heat on the surface of the base or substrate material, the carriers and the walls of the coating chamber that are exposed to the coating process and promotes the desorption of any gases present, not only on the exposed surfaces but also from internal cavities and surface of the sputtering system. The desorption can be made to occur without harm to the sputtering process by forcing the desorption to occur prior to the sputtering process. This requires heating and outgassing of the sputtering chamber and any materials introduced into the sputtering chamber.

Predeposition outgassing of each of the carriers 90—90 and the substrate sheets 32—32 is achieved in the first four auxiliary processing chambers 41 to 44, inclusive, during an approximately fifteen-minute trip through the four chambers. The first four chambers 41 to 44, inclusive, which are not only used to outgas the substrate sheets 32—32 but to facilitate controlling the pressure in the open-ended sputtering chamber 45, are each provided with at least one iodine-cycle quartz lamp, designated generally by the numeral 141 (FIG. 16), mounted in a specially built reflector 142. The reflectors 142—142 are designed to distribute the infrared energy from the lamps 141—141 uniformly across the carriers 90—90 and substrate sheets 32—32 passing through the chambers 41 to 44, inclusive.

The substrate sheets 32—32 and carriers 90—90 are subjected to a higher temperature and a lower pressure than is anticipated in the sputtering chamber 45 to bake out the gases and vaporize other surface contaminants and minimize desorption of gases from the substrate sheets 32—32 and carriers 90—90 during film deposition in the sputtering chamber 45. The effectiveness of the preheating in the chambers 41 to 44, inclusive, can be demonstrated by the fact that the purity of a 2000-angstrom-unit film, in terms of specific resistivity, changed from 415 to 240 micro-ohm centimeters as the power input to each of the lamps 141—141 was varied from 0 to 325 watts. In comparison with these results, 240 micro-ohm centimeters is commonly attained in bell jar batch production methods where, however, the preheat time required is bell jars to achieve this resistivity is usually longer.

In the basic sputtering process an inert gas, such as argon, is ionized in a glow discharge. The ionized gas atoms dislocate metal atoms from a cathode and thereby coat the substrate. Some metal ions such as the tantalum ions are highly reactive; therefore, if tantalum metal is to be deposited on substrate sheets 32—32 for use in manufacturing electronic circuits, the inert gas must be of high purity to get a layer of relatively pure tantalum deposited on the substrate sheets 32—32. The gas pressure or density of gases in the sputtering chamber 45 must be low enough to minimize collisions of the tantalum atoms with the gases in the path of the tantalum atoms and the total flow of contaminants across the glow discharge region of the sputtering chamber 45 must be small. This requires a vacuum system in which the sputtering chamber is virtually leakproof. It is not enough that the leakage into the sputtering chamber 45 is small enough to permit the pumping system 65 to provide some predetermined relatively low pressure in the chamber 45. This could be accomplished by providing the pumping system 65 adequate to pump at rates at least as fast as the rates of air leakage into the chambers 41 to 51, inclusive. However, the problem of contamination of the coating chamber by air flowing through the calibrated leaks 140—140 cannot be tolerated when using this vacuum process for coating high purity tantalum thin films 31—31 on substrate sheets 32—32 for use in the thin-film circuits.

To insure that the inflow or diffusion of contaminants into the coating chambers 45 and 47, used for coating with highly reactive metals like tantalum, is held to a minimum, high-vacuum, buffer chambers 44, 46 and 48 are provided on each side of the coating chambers 45 and 47. The buffer chambers 44, 46 and 48 insure that the pressure of the atmosphere in the sputtering chamber 45 (or chambers 45 and 47) is maintained higher than the pressures of the atmospheres in immediately adjacent chambers 44, 46 and 48.

The glow discharge in the sputtering chamber 45 is provided by placing a shielded, vertical cathode 145 (FIG. 16) formed of a flat ⅛-inch thick plate of relatively high-purity tantalum, which is to be deposited on the substrate sheets 32—32 in the sputtering chamber 45, and applying a relatively high electrical potential to the cathode 145, which is approximately 5000 volts negative with respect to the chamber 45, the channel 85 and carriers 90—90 which are all grounded. The potential is applied to the cathode 145 by a feedthrough 146 extending through the plate 54 of the chamber 45 and a shield 144. The cathode 145 is positioned in the sputtering chamber 45 in a vertical plane parallel to a vertical plane containing the longitudinal axes of the channel 85 and the aligned carriers 90—90 in the channel 85. The vertical orientation of the substrate sheets 32—32 and cathode 145 permits any foreign particles which may exist in the sputtering chamber 45 to fall freely to the bottom of the chamber 45 and not become lodged on the substrate sheets 32—32 or cathode 145. The cathode 145 is preferably 2 inches from the tracks 91—91 and is at least three times as wide as the substrate sheets 32—32. The preferred cathode 145 is 27 inches long and 11 inches wide.

A gas metering system, designated generally by the numeral 147 (FIG. 9), is provided for introducing argon gas into the partially evacuated sputtering chamber 45 at a controlled, predetermined rate of approximately 23 standard cubic centimeters per minute, thus creating an argon atmosphere in the sputtering chamber 45 and maintaining the pressure in the chamber 45 at approximately $3 \times 10^{-2}$ Torr, which is a higher pressure than the pressure in chambers 44 and 46. The argon gas may be ionized prior to its entry into the sputtering chamber 45 but is ionized preferably by collisions with electrons moving at high velocities between the cathode 145 and the grounded chamber 45 and other grounded elements in the chamber. The electrons strike the argon atoms and knock additional electrons off the argon atoms. The resulting ionized argon atoms or positively charged ions of argon gas bombard the cathode 145 causing atoms of tantalum to be dislodged from the cathode 145 and be deposited in a strongly adhering, substantially uniform, thin film of tantalum on exposed surfaces of the carriers 90—90, channel 85 and chamber 45 as well as the exposed surfaces 137—137 of the substrate sheets 32—32.

Tantalum thin films without intentional additions may be used for capacitors; however, electrical resistors are made preferably by introducing one to five percent nitrogen into the sputtering chamber 45. The nitrogen reacts with the tantalum and the resultant film contains an appreciable amount of tantalum nitride. The production of such tantalum nitride films, necessitating the addition of a small amount of essentially pure nitrogen to the controlled flow of argon into the sputtering chamber 45, requires that the flow of nitrogen into the sputtering chamber 45 must be precisely controlled, with respect to the flow of argon into the chamber, to within ±0.03 std. cc.

per minute. To meet this need, a device, designated generally by the numeral 148 (FIG. 9), is provided for introducing a relatively small amount of relatively pure nitrogen gas into the sputtering chamber 45 at a controlled rate proportional to the volumetric flow of argon into the sputtering chamber to nitride the tantalum and improve the stability of the electrical sheet resistivity of the thin films 31—31 of tantalum deposited on the substrate sheets 32—32.

Because tantalum is highly reactive, it is desirable to prevent the exposure of the freshly sputtered films 31—31 on the substrate sheets 32—32 to active elements, such as oxygen, until the films 31—31 have cooled from the high temperatures existing in the sputtering chamber 45. For this reason, the chambers 48 to 51, inclusive, following the sputtering chamber 45 are provided with copper cooling coils 149 (FIG. 5) which extend around the tracks 91—91 so that the films 31—31 will be cool by the time the carriers 90—90 emerge from the channel 85.

After the carriers 90—90 containing the coated substrate sheets 32—32 are removed from the series of processing chambers 41 to 51, inclusive, the carriers 90—90 are pushed automatically around a semicircular guide 150 (FIGS. 1 and 12) to reverse the orientation of the carriers 90—90. The semicircular guide 150 is enclosed and is not provided with any drive mechanism. The carriers 90—90, after leaving the last processing chamber 51, continue to be pushed, by the feed mechanism 105, in end-to-end engagement around the semicircular guide 150 onto a motor-driven, endless conveyor, designated generally by the numeral 152, and are returned to the entrance end of the apparatus 30. The endless conveyor 152 includes a series of interconnected, elongated, helical springs 151—151 supported by a plurality of pulleys 155—155.

A cross-feeding mechanism, designated generally by the numeral 153 (FIGS. 12 and 13), receives the carriers 90—90 which are returned to the entrance end of the apparatus 30 and transfers the carriers 90—90 to the magazine 101 where the sputtered substrate sheets 32—32 are removed from the carriers 90—90 and clean, uncoated substrate sheets 32—32 are inserted in the carriers 90—90 in preparation for a subsequent sputtering operation. The cross-feed mechanism 153 includes a carriage 156 which is mounted reciprocally on a pair of rods 157—157. The carriage 156 is reciprocated by a fluid-operated, piston-cylinder assembly 158. When the carriage 156 is in a retracted position, against a limit switch 163, and one of the carriers 90—90 being returned to the entrance end of the apparatus 30 is urged onto the carriage 156 by the conveyor 152, the carrier 90 strikes a limit switch 159. The limit switch 159 closes to energize a relay 164 which, in turn, latches the succeeding carrier 90 in place to prevent the group of carriers from being pushed into the cross-feed mechanism 153 until the carriage 156 is retracted. The assembly 158 is also actuated to move the carriage 156 and carrier 90 to the right as viewed in FIG. 13 to urge the carrier 90 into the magazine 101. Retroflexed springs 161—161 are used to prevent the carriers 90—90 from being removed from the magazine 101 when the carriage 156 is retracted by the assembly 158.

The endless conveyor 152 is driven by a motor 162 at a speed slightly faster than the speed of the feed mechanism 105 so that any queue of the carriers 90—90 will be maintained in the magazine 101 at the entrance end of the apparatus 30. The feed mechanism 105, semicircular guide 150, return conveyor 152 and cross-feed mechanism 153 are so arranged, in cooperative relationship, that the orientation of the carriers 90—90 are changed 180° between each successive pass of each of the carriers 90—90 through the apparatus 30.

The apparatus 30 has cycle times or durations of specific operations which are compatible with other in-line operations and, therefore, the apparatus 30 is capable of being integrated with other equipment in an automatic production line.

*Operation*

The operation starts adjacent to the entrance end of the open-ended, continuous-vacuum processing apparatus 30 where the relatively clean, uncoated substrate sheets 32—32 are loaded into the carriers 90—90 by an operator. The carriers 90—90 are guided centrally on the channel 85 by the relatively hard, accurately shaped, horizontally extending tracks 91—91 projecting from the center of the bottom and the top of the channel 85. The carriers 90—90 with the flat, rectangular glass or ceramic substrate sheets 32—32 mounted thereon are pushed in end-to-end engagement through the series of modular vacuum processing chambers 41 to 51, inclusive, interconnected with each other and the outside world through restricted openings or calibrated clearances 140—140. The first four chambers 41 to 44, inclusive, are used to preheat and outgas the substrate sheets 32—32 and carriers 90—90 prior to the sputtering of tantalum on the substrate sheets in the fifth chamber 45. The sixth chamber 46 is a buffer chamber. The seventh chamber 47 is an auxiliary sputtering chamber which may be used as an alternate tantalum sputtering chamber or for deposition of other metals. The remaining chambers 48 to 51, inclusive, are used for post deposition cooling of the substrate sheets 32—32.

A constant pressure is maintained in each of the chambers 41 to 51, inclusive, by the pumping system 65 while the substrate sheets 32—32 are moved continuously into, through and out of the vacuum chambers 41 to 51, inclusive, on the three-piece carriers 90—90 through the system of calibrated leaks 140—140. The calibrated clearances 140—140 are provided between the carriers 90—90 and the channel 85 to prevent the carriers from rubbing on the sides of the channel and insure accurately controlled, calibrated leakages past the carriers. The leaks 140—140 permit small amounts of air to flow viscously into the chambers 41 and 51 on the opposite ends of the apparatus 30 where the pressure is reduced to 3.5 Torr; however, the air leaking into the second pair of chambers 42 and 50, from the ends of the apparatus 30, is in transition between viscous and molecular flow and the pressure is reduced to $4 \times 10^{-3}$ Torr. The flow between the chambers 42 and 43 and the chambers 49 and 50 is molecular permitting pressures of $10^{-6}$ Torr range which is approximately 1/760,000,000 of an atmosphere to be attained in the chambers 43 through 49 and, thus, sustaining a pressure less than that required for sputtering thin films of tantalum.

The low pressure required to sputter tantalum represents only moderate vacuums and can be achieved by merely restricting the air flow into and out of the chambers 41 to 51, inclusive, and providing sufficient pumping capacity to remove gases from the chambers at rates which are at least as fast as the rates at which gases are entering the chambers. However, the need to carefully control the purity of the tantalum film imposes the requirement that the sputtering chambers 45 and 47 must be nearly leakproof. It is not merely enough that the leaks into the sputtering chambers 45 and 47 be small enough to permit the pumping system 65 to maintain some particular low pressure in the sputtering chambers. The total flow of contamination of the tantalum in the sputtering chambers 45 and 47, by air flowing from the ambient atmosphere through the open ends in the chambers 41 to 51, inclusive, in excess of approximately 0.01 percent of the normal flow of the argon gas used for sputtering cannot be tolerated. The flow of contaminants into the sputtering chambers 45 and 47 is prevented by providing the high-vacuum curtains or the buffering chambers 44, 46 and 48 on each side of the sputtering chambers 45 and 47, which are held at higher pressures such as $3 \times 10^{-2}$ Torr by introducing argon, thereby causing an outward flow of the argon to the buffer chambers rather than an influx of air from them.

Diffusion tests have been conducted to determine the amount of contaminants introduced into the sputtering chamber 45 through the open ends of the apparatus 30. A helium atmosphere was provided at the input to the apparatus 30, and a helium mass spectrometer leak detector was connected to the sputtering chamber 45 to measure the diffusion of helium through the successive leaks 140—140 into the sputtering chamber 45. The results indicate that the amount of contaminants reaching the sputtering chamber 45 from the open ends of the apparatus 30 is less than one-millionth of the normal volumetric flow of the argon gas into the sputtering chamber 45.

The feed mechanism 105 pushes one of the carriers 90—90 at a time into the apparatus 30 and pushes the carriers 90—90 that are in the apparatus 30 forward. When one of the gear racks 106—106 of the feed mechanism 105 has reached the end of its stroke, the next carrier 90 in the magazine 101 is indexed into position behind the previous carrier 90 and is moved ahead by the other hitch feed 115 of the feed mechanism 105. Thus, as the individual carriers 90—90 are pushed into the apparatus 30, the line of carriers 90—90 already in the apparatus 30 are pushed forward and the line of carriers moves through the apparatus on a continuous basis at a predetermined rate.

The vertical carriers 90—90 and substrate sheets 32—32 pass through the first four chambers 41 to 44, inclusive, which are used to heat and outgas or heat-clean the carriers and substrate sheets before the sheets and carriers enter the sputtering chamber 45 where a thin film of tantalum is sputtered on the substrate sheets and exposed surfaces of the carriers.

In the sputtering process, argon gas is metered into the highly reduced pressure of the sputtering chamber 45 by the metering device 147 and is charged by a relatively high, negative voltage of approximately 5000 volts being applied to the vertical cathode 145. The argon atoms are ionized and the electrically charged argon ions strike the high-purity tantalum cathode 145, thereby dislodging particles of tantalum which are deposited in thin films 31—31 on the exposed areas 137—137 of the substrate sheets 32—32. Small amounts of nitrogen are also introduced into the controlled flow of argon in the sputtering chamber 45 by the metering device 148 to dope the sputtered tantalum and form the tantalum nitride films 31—31 on the substrate sheets 32—32.

Deposition rates of 200 to 500 angstroms per minute have been used, with the time of exposure to the sputtering tantalum varying from 2 to 8 minutes, depending on the thickness of tantalum required. In the specific embodiment 300 angstroms per minute for 4 minutes was used to produce a 1200-angstrom-unit film used for producing thin-film resistors. After the tantalum thin film is coated on the substrate sheet 32, the substrate sheet 32 is cooled and brought back to ambient atmospheric pressure during an approximately 10-minute period by being pushed through the final series of chambers 48 to 51, inclusive, where the pressure is increased and the temperature is decreased progressively in successive chambers so that one cooled, freshly coated substrate sheet 32 emerges from the exit end of the apparatus 30 each 40 seconds.

After the carriers 90—90 leave the channel 85, they are returned to the entrance end of the apparatus 30 where the processed substrate sheets 32—32 are removed and the carriers 90—90 are reloaded with relatively clean, uncoated substrate sheets 32—32 for subsequent coating operations.

Although the apparatus 30 is designed to operate continuously, it can be started at a fairly rapid rate after shutdown. With the channel 85 full of carriers 90—90, the desired operating pressures can be reached in all of the chambers 41 to 51, inclusive, in approximately 10 minutes after start up.

The capability of such an open-ended, vacuum-processing apparatus 30 for depositing thin films 31—31 of tantalum on inorganic substrate sheets 32—32 can be judged only by examining the quality of the films produced by such an apparatus. The quality has been judged primarily by measuring three different properties of the thin films 31—31. The properties of the films 31—31 measured are thickness, specific resistivity and temperature coefficient of resistivity. Specific testing methods have been developed to insure that the measured variability of the properties of the films 31—31 actually exist and are not a result of errors in the testing equipment. In order to determine if the apparatus would possess reproducible properties at a useful quality level, a series of tests were made. For these tests one 1½ by 3-inch coated limeglass substrate 32 was sputtered with tantalum each minute. The data were obtained during a one-month period. By adjusting the operating conditions of the apparatus 30 so that the power applied to the quartz lamps 141—141 in chambers 41, 42, 43 and 44 was 300 watts, 300 watts, 300 watts and 220 watts, all respectively, the pressure in the sputtering chamber 45 was $3.2 \times 10^{-2}$ Torr gauge reading. The potential applied to the cathode was 4500 volts D.C., with a sputtering current of 500 ma., the cathode-anode spacing was 2.0 inches and the area of the active surface of the cathode was 158 square inches. The results of these tests are illustrated in FIG. 18 and indicate films produced with the preferred embodiment of the apparatus operating under these conditions have a specific resistivity of 240 micro-ohm cm. and a temperature coefficient of resistance of +56 p.p.m./° C. at a nominal thickness of 1190 angstroms. The process controllability for these films was estimated from control charts to have a standard deviation of 11 micro-ohm cm. in the specific resistivity and 17 p.p.m./° C. in the temperature coefficient of resistance. The film thickness was shown to be controllable with a standard deviation of 50 angstroms about a means of 1190 angstroms. Accelerated aging tests have indicated that resistors, suitable for use in elaborate communication equipment, can be produced with the subject methods and apparatus and, under normal loads, will have an average change of 0.4% in resistance in twenty years.

While the apparatus is described in its preferred embodiment as being particularly applicable for overcoming difficult problems involved in sputtering uniform and stable thin films of tantalum on inorganic substrate sheets for use in making integrated thin-film circuit components, and may find its greatest utility in this specific area, the novel features on which the preferred apparatus is based are directly applicable to a wide variety of operations not necessarily restricted to making tantalum thin-film circuits. Apparatus utilizing principles of the present invention may be used for various, diverse manufacturing operations requiring a clean environment or controlled gaseous or liquid environment operating at relatively high pressures, relatively lower pressures or any other desired pressure.

It is to be understood that the above-described arrangements are simply illustrative of the principles of the invention. Other arrangements may be devised by those skilled in the art which will embody the principles of the invention and fall within the spirit and scope thereof.

What is claimed is:
1. Open-ended, continuous processing apparatus, which comprises:
    an elongated, open-ended, apertured channel extending longitudinally through the apparatus, the channel defining a passage through which material to be processed enters the apparatus from ambient atmosphere, passes through the apparatus and exits into ambient atmosphere;
    a plurality of interconnected, open-ended chambers sup- porting the channel, individual chambers surrounding apertured portions of the channel and containing processing atmospheres to which the material in the channel is exposed through the apertures therein;

means connected to the chambers for maintaining predetermined pressures in the processing atmospheres in the chambers;

guide means extending along the channel on the inside surface thereof;

a plurality of identically shaped carriers for conveying the material through the apparatus, the carriers having portions projecting transversely outwardly beyond the entire outer peripheries of the material carried by the carriers, segments of the projecting portions of the carriers being complementary in shape to the guide means and cooperating therewith to align the carriers axially and accurately position the carriers in the channel, the axial alignment of the carriers and positioning of the carriers accurately in the channel providing uniform, restricted clearances between the outer peripheries of the enlarged portions of the carriers and inside surfaces of the channel sufficiently large to allow the carriers to move freely through the channel and still provide sufficient resistance to the flow of fluids to and from the chambers to permit predetermined pressures to be maintained in the chambers; and means for moving the carriers through the channel.

2. Open-ended apparatus for processing material entering into and exiting from the open ends of the apparatus on a continuous basis, which comprises:

an elongated, open-ended channel extending longitudinally through the apparatus and defining a passage through which material to be processed enters the apparatus from ambient atmosphere, passes through the apparatus and exits into the ambient atmosphere;

an enclosure surrounding the channel;

the channel having guide means extending along the inside surface thereof, and apertures of predetermined lengths formed therein to permit the passage defined by the channel to communicate with the inside of the enclosure;

means for dividing the enclosure into a series of chambers encompassing successive apertures in the channel;

means connected to the chambers for maintaining fluid media of predetermined pressures in the chambers surrounding the apertures;

a plurality of identically shaped carriers for conveying the material to be processed through the channel, the carriers being positioned in end-to-end abutting relationship in the channel, the carriers having enlarged portions projecting transversely outwardly beyond the entire outer peripheries of the material supported on the carriers, segments of the enlarged portions of the carriers being complementary in shape to the guide means and cooperating therewith to align the carriers in the passage axially with respect to each other and accurately position the carriers in the channel, the axial alignment of the carriers and positioning of the carriers accurately in the channel providing uniform, restricted clearances between the outer peripheries of the enlarged portions of the carriers and inside surfaces of the channel sufficiently large to allow the carriers to move freely through the channel and still provide sufficient resistance to the flow of fluids to and from the chambers to permit the predetermined pressures to be maintained in the chambers; and means for moving the carriers through the channel in end-to-end engagement on a continuous basis to expose the material on successive carriers to the fluid media in successive chambers for predetermined variable periods of time.

3. Open-ended apparatus for processing material entering into and exiting from the open ends of the apparatus on a continuous basis, which comprises:

a pair of straight, parallel guide tracks extending longitudinally through the apparatus;

shroud means surrounding a plurality of spaced sections of the tracks and cooperating therewith to form an elongated, straight passage through the apparatus, the shroud means and the tracks cooperating to completely surround spaced portions of the passage of predetermined varying lengths;

a plurality of identically shaped carriers for conveying material to be processed through the apparatus along the guide tracks, the carriers having enlarged portions which project transversely beyond the entire outer peripheries of the material supported by the carriers and cooperate with the tracks to axially align the carriers and position the carriers accurately with respect to the tracks;

means for moving the carriers through the apparatus along the guide tracks in end-to-end abutting relationship;

the completely surrounded portions of the passage being spaced axially along the tracks predetermined distances from each other to form openings of predetermined lengths into the sides of the passage for exposing the passage and the carriers positioned therein to surrounding atmospheres, portions of the inner surfaces of the completely surrounded sections of the passage, defined by the shroud means and the tracks, being spaced a predetermined distance from the outer peripheries of the enlarged portions of the carriers supported by the tracks to provide predetermined restricted clearances therebetween;

enclosure means surrounding the openings between each pair of the adjacent, completely surrounded sections of the passage through which the carriers in the passage are exposed, the enclosure means having transversely extending portions sealed hermetically to the shroud means to form a series of processing chambers, the adjacent chambers communicating with each other and the end chambers in the series of chambers communicating with ambient atmosphere through the openings between the completely surrounded passages and restricted leakage paths in the completely surrounded sections of the passage defined by the predetermined restricted clearance between the tracks and shroud means and the carriers, the leakage paths between different chambers and between the end chambers and the ambient atmosphere being of different lengths to facilitate maintenance of different pressures in different chambers; and means connected to the chambers for maintaining predetermined pressures in the atmospheres in the chambers;

4. Open-ended apparatus for processing parts entering into and exiting from the open ends of the apparatus on a continuous basis, which comprises:

an enclosure having a pair of open ends;

means for dividing the enclosure into a series of interconnected chambers having apertures in the ends thereof through which parts pass from ambient atmosphere and exit into ambient atmosphere through the open ends of the enclosure;

means connected to the chambers for maintaining processing atmospheres therein of predetermined pressures;

an elongated, open-ended channel extending longitudinally through the enclosure and defining a passage through which the parts pass, the channel having apertures of predetermined lengths formed therein which permit the passage, defined by the channel, to communicate with the successive chambers and having unapertured portions of predetermined varying lengths interconnecting the portions of the passage communicating with the successive chambers to form uniform, restricted leaks of varying lengths for permitting atmospheres of different pressures to be maintained in different chambers;

a plurality of identically shaped carriers for conveying the parts through the channel, the carriers being positioned in end-to-end abutting relationship in the portions of the passage interconnecting the communicating portions of successive chambers, carriers having enlarged portions designed to project transversely outwardly beyond the entire outer peripheries of the parts supported thereby, the enlarged portions of the carriers being spaced axially along the channel to form mechanical, nonhermetic, sealing means in the channel between the portions thereof communicating with the successive chambers to permit uniform, restricted leakage of gases through the channel between adjacent chambers and permit free movement of the carriers from ambient atmosphere through the apparatus and back into ambient atmosphere; and means for moving the carriers through the channel in the end-to-end abutting relationship.

5. A continuous vacuum processing apparatus, which comprises:

a plurality of interconnected, open-ended chambers containing processing atmospheres;

means connected to the chambers for evacuating the chambers to predetermined pressures;

an elongated, open-ended tube extending longitudinally through the apparatus and being supported at the chamber walls, the tube having apertures therein to expose the inside of the tube to the processing atmospheres in the chambers, the tube defining a passage through which articles to be processed enter the apparatus from ambient atmosphere, pass through the apparatus and exit into the ambient atmosphere;

hard, accurately shaped rails extending along the inside surface of the tube;

a plurality of identically shaped carriers for conveying the articles to be processed through the apparatus, the carriers having enlarged, hardened, accurately shaped end portions projecting transversely outwardly beyond the entire outer peripheries of the articles carried by the carriers, segments of the end portions thereof being bifurcated to straddle the hard rails, to align the carriers axially and center the carriers in the tube, the axial alignment of the carriers and positioning of the carriers centrally of the tube providing a uniform, restricted clearance between the outer peripheries of the carriers and the inside surfaces of the tube sufficiently large to allow the carriers to move freely through the tube and still provide sufficient resistance to air flow to and from the chambers to permit the required reduced pressures to be maintained in the chambers; and means for moving the carriers in abutting relationship along the tube through the interconnected chambers at a predetermined velocity.

6. A continuous vacuum processing apparatus, which comprises:

a plurality of interconnected chambers;

means connected to the chambers for evacuating the chambers to predetermined pressures;

a pair of parallel guides extending longitudinally through the apparatus and being supported at the interchamber walls;

shrouding means of different lengths being secured to the guides at the interchamber walls with the ends of the shrouding means being spaced from each other to provide open-ended, elongated passages into and out of each chamber;

a plurality of identically shaped carriers for conveying parts through the apparatus, the carriers having enlarged end portions which project transversely outwardly beyond the entire outer peripheries of the parts supported on the carriers, segments of the end portions being complementary in shape to the guides to align the carriers axially and center the carriers in the elongated passages, the positioning of the axially aligned carriers centrally of the elongated passages providing uniform, restricted clearances between the outer peripheries of the carriers and the inside surfaces of the passages sufficiently large to allow the carriers to move freely through the apparatus and sufficiently small to form a nonhermetic seal at the entrance and exit of each chamber which provides sufficient resistance to air flow through the passages to permit the reduced pressures to be maintained in the chambers, the restricted clearance being of uniform cross section and the passages into and out of different chambers being of different lengths; and means for moving the carriers along the guides through the interconnected chambers.

7. A continuous vacuum processing apparatus, which comprises:

a plurality of interconnected, open-ended chambers containing processing atmospheres;

means connected to the chambers for evacuating the chambers to predetermined pressures;

an elongated, open-ended tube extending londitudinally through the apparatus, the tube being supported at the chamber walls and having apertures which communicate with the chambers to expose the inside of the tube adjacent to the apertures to the atmosphere in associated chambers, the tube defining a passage through which articles to be processed enter the apparatus from ambient atmosphere, pass through the apparatus and exit into the ambient atmosphere;

guide tracks projecting from and extending along the center of opposite sides of the inside surface of the tube;

a plurality of identically shaped carriers for conveying articles to be processed through the apparatus to expose the articles to the atmosphere in the successive chambers, the carriers having enlarged, hardened end portions projecting transversely outwardly beyong the entire outer peripheries of the articles supported by the carriers, segments of the end portions being bifurcated to straddle the relatively hard tracks to align the carriers axially and center the carriers in the tube, the positioning of the axially aligned carriers centrally by the guide tracks of the tube providing a uniform, restricted clearance between the outer peripheries of the carriers and the inside surfaces of the tube sufficiently large to allow the carriers to move freely through the tube and still form nonhermetic seals for the chambers which provide sufficient resistance to air flow into the chambers to permit the required reduced pressures to be maintained in the chambers, the restricted clearance between different apertures, exposing the inside of the tube to different associate chambers, being of a uniform cross section and the lengths of the nonhermetic seals in different chambers being of different lengths; and means for moving the carriers along the tube through interconnected chambers to expose the articles supported on the carriers to the processing atmospheres in the chambers through the apertures in the tube.

8. A continuous vacuum processing apparatus, which comprises:

a plurality of interconnected, open-ended chambers containing processing atmospheres;

means connected to the chambers for evacuating the chambers to predetermined pressures;

an elongated, open-ended, apertured tube extending longitudinally through the apparatus and being supported at the interchamber walls, the tube defining a passage through which articles to be processed enter the apparatus from ambient atmosphere, pass through the apparatus to be exposed to the processing atmosphere contained in the chambers and exit into the ambient atmosphere;

guide means formed on the inside surface of the tube;

a plurality of identically shaped carriers for conveying articles to be processed through the apparatus, the carriers having enlarged end portions projecting transversely outwardly beyond the entire outer peripheries of the articles supported by the carriers, segments of the end portions being shaped to cooperate with the guide means formed on the inside surface of the tube to align the carriers axially and center the aligned carriers in the tube, the positioning of the aligned carriers centrally of the tube providing a uniform, restricted clearance between the outer peripheries of the carriers and the inside surfaces of the tube sufficiently large to allow the carriers to move freely through the tube and still form nonhermetic seals for the chambers which provide sufficient resistance to air flow into the chambers to permit the required reduced pressures to be maintained in the chambers;

portions of the tube and guide means adjacent to the apertures in the tube being beveled to permit any fragments of foreign materials to drop from the guide means and tube into the bottoms of the chambers and prevent the carriers from binding in the tube; and means for moving the carriers from ambient atmosphere, along the tube, through the interconnected chambers to expose the articles to the processing atmosphere contained therein, and back to ambient atmosphere.

9. A continuous vacuum processing apparatus, which comprises:

a plurality of interconnected, open-ended chambers containing processing atmospheres;

means connected to the chambers for evacuating the chambers to predetermined pressures;

an elongated, apertured tube extending longitudinally through the apparatus and being supported at the interchamber walls, the apertured portions of the tube being positioned in the chambers to expose the inside of the tube to the atmosphere in the chamber;

hard, accurately shaped tracks extending along the center of opposite sides of the inside surface of the tube;

a plurality of identically shaped carriers for conveying material to be processed through the apparatus and exposing the material to the atmosphere in the chambers as the material passes the apertures in the tube, the carriers having enlarged, hardened, accurately shaped, end portions projecting transversely outwardly beyond the entire outer peripheries of the material supported by the carriers, upper and lower segments of the end portions being bifurcated to straddle the hard tracks to align the carriers axially and center the carriers in the tube, the positioning of the axially aligned carriers centrally of the tube providing a uniform, restricted clearance between the outer peripheries of the carriers and the inside surfaces of the tube sufficiently large to allow the carriers to move freely through the tube and still provide sufficient resistance to air flow between apertured sections of the tube positioned in the chambers to permit the required reduced pressures to be maintained in the chambers, the calculated clearance being of uniform cross section and the distance between apertures in different chambers being of different lengths;

portions of the tracks and sidewalls of the tube surrounding the apertures in the chambers being beveled to permit any fragments of foreign materials to drop from the track and tube into the bottoms of the chambers and prevent the carriers from binding on the track and in the tube; and means for pushing the carriers through the tube at a predetermined rate.

10. A processing apparatus wherein articles to be processed by the apparatus are fed from ambient atmosphere through the apparatus and exit from the apparatus into ambient atmosphere on a continuous basis, which comprises:

a plurality of interconnected, open-ended chambers containing processing fluid media;

means connected to the chambers for controlling the pressure of the fluid media in the chambers;

an elongated, horizontal tube extending longitudinally through the interconnected chambers and being supported intermediate the ends thereof by walls of the individual chambers, opposite ends of the tube being exposed to ambient atmosphere through which ends articles to be processed enter and exit from the apparatus, portions of the tube extending through the chambers being provided with apertures to permit the controlled fluid media in the chambers to communicate with inside portions of the tube extending therethrough;

guide means formed on the inner surface of the walls of the tube;

a plurality of identically shaped carriers for conveying articles to be processed through the tube, the carriers having portions projecting transversely outwardly beyond the articles supported by the carriers, the transversely projecting portions of the carriers having closely fitting segments mounted slidably in the guide means formed on the inner surface of the tube and cooperating therewith to align the carriers axially and position the carriers accurately with respect to the inner surfaces of the walls of the tube, the accurate positioning of the axially aligned carriers within the tube providing uniform, restricted clearances between the outer peripheries of the carriers and the inside surfaces of the walls of the tube, the uniform, restricted clearance between the outer peripheries of the carriers and the inside surfaces of the tube being sufficiently large to allow the carriers to move freely through the tube and still provide sufficient resistance to the flow of fluids through the tube to permit required pressures to be maintained in the fluid media in the various chambers; and means for propelling the carriers through the tube at a predetermined rate.

11. Apparatus for processing workpieces continuously under relatively accurately controlled pressures and atmospheric conditions, the apparatus being open to ambient atmosphere to permit ready entrance and exit of the workpieces into and out of the apparatus without affecting the operating stability of the apparatus for effecting high rate production of uniform, permanently adherent, high purity films of metals on workpieces which have been unattainable heretofore, which comprises:

a plurality of interconnected, open-ended, processing chambers including a work chamber open at both ends which is used for depositing tantalum thin films on workpieces being moved through the work chamber continuously through the openings thus eliminating any need for opening and closing hermetic seals;

means for partially evacuating the processing chambers to maintain a predetermined pressure gradient in the series of chambers;

a smooth, accurately dimensioned, elongated, horizontal channel extending from ambient atmosphere through the processing chambers including the work chamber and back to ambient atmosphere through which the workpieces travel, the channel defining a predetermined processing path, the channel having apertures spaced along the axis thereof which communicate with the plurality of processing chambers spaced along the path of travel of the workpieces through the channel;

a plurality of identical carriers for conveying the workpieces through the channel, the carriers having portions thereof which project outwardly beyond the entire outer peripheries of the workpieces supported by the carriers, and which cooperate with the channel to provide highly uniform, restricted passages having predetermined clearances sufficiently large to permit free passage of the carries through the channel without physically or chemically interfering with the satisfactory operation of the process of producing tantalum thin films having controllable and reproducible characteristics;

means for pushing the carriers through the passage in end-to-end engagement at a predetermined rate; and means for guiding the carriers through the channel while preventing the carriers from touching the sides of the channel, thus permitting carriers containing workpieces to be moved in and out of the chambers without interferring with the accurately controlled, predetermined pressure gradient of the chambers necessary for sputtering uniform layers of tantalum on the workpieces.

12. An open-ended, semiautomatic apparatus for sputtering thin films of tantalum nitride having desired electrical properties on successive substrate sheets of a series of such sheets moving continuously from ambient atmosphere through various processing chambers in the apparatus and back to ambient atmosphere, which comprises:

a plurality of open-ended, interconnected chambers communicating with each other through calibrated clearances, the chambers including heating and outgassing, sputtering and cooling chambers;

means connected to the chambers for evacuating the chambers to provide controlled, partial vacuums of predetermined pressures in the chambers;

a horizontal tube extending longitudinally through the apparatus and being supported intermediate the ends thereof by walls of the individual chambers, opposite ends of the tube being exposed to ambient atmosphere through which ends substrate sheets to be processed enter and exit from the apparatus, portions of the tube extending through the chambers being provided with apertures to permit controlled atmospheres in the chambers to communicate with inside portions of the tube extending therethrough;

guide means formed on the inner surface of the walls of the tube;

a plurality of identically shaped, vertically oriented carriers having recessed portions designed for supporting substrate sheets vertically and conveying the substrate sheets to be processed horizontally through the tube, the carriers having relatively accurately dimensioned portions cooperating with the guide means formed on the inner surface of the tube to align the carriers axially and position the carriers accurately with respect to the inner surfaces of the walls of the tube, the accurate positioning of the axially aligned carriers within the tube preventing the sides of the carriers from rubbing on the inside surface of the tube and providing uniform, restricted clearance between the outer peripheries of the carriers and the inside surfaces of the walls of the tube, the restricted clearance between the outer peripheries of the carriers and the inside surfaces of the tube being sufficiently large to allow the carriers to move freely through the tube and still provide sufficient resistance to the flow of gases through the tube to permit the partial vacuums of predetermined pressures to be maintained in the various chambers;

means for pushing the carriers through the tube in end-to-end engagement at a predetermined rate;

a vertical cathode formed of a plate of high-purity tantalum to be deposited on the substrate sheets positioned in the sputtering chamber and in a vertical plane parallel to a vertical plane containing the longitudinal axis of the tube, the vertical orientation of the substrate sheets and cathode permitting any foreign particles which may exist in the sputtering chamber to fall freely to the bottom of the chamber;

means for applying a relatively high, negative, electrical potential to the cathode;

means for introducing argon gas into the partially evacuated sputtering chamber at a predetermined rate, the argon gas entering the sputtering chamber being ionized so that ionized atoms of the argon gas bombard the cathode causing atoms of tantalum to be dislodged from the surface of the cathode and be deposited in strongly adhering, substantially uniform, thin films of tantalum on the surfaces of the substrate sheets;

means for introducing a relatively small amount of relatively pure nitrogen gas into the sputtering chamber at a controlled rate proportional to the volumetric flow of argon into the sputtering chamber to nitride the tantalum and improve the stability of the electrical resistivity of the thin films of tantalum deposited on the substrate sheets;

means for subjecting the substrate sheets being pushed to the sputtering chamber to a higher temperature and lower pressure than exist in the sputtering chamber to remove absorbed and adsorbed gases from the substrate sheets and vaporize other surface contaminants on the sheets;

the processing of the substrate sheets taking place uninterruptedly in the series of interconnected chambers having atmospheres maintained at substantially constant pressures while the substrate sheets are moved continuously into, through and out of the series of processing chambers through a series of the restricted clearances, the amount of contaminants reaching the sputtering chamber from the open ends of the tube being less than one-millionth of the volume flow of the argon gas used for the sputtering atmosphere; and means for cooling the tantalum-coated substrate sheets being removed from the sputtering chamber to prevent the tantalum thin films on the substrate sheets from being exposed to the ambient atmosphere at an elevated temperature.

13. A continuous vacuum processing system, which comprises:

a plurality of interconnected processing chambers for containing atmospheres of predetermined pressures and atmospheric conditions;

means connected to the processing chambers to control the pressure and atmospheric conditions thereof;

an elongated channel extending longitudinally through the interconnected chambers, apertures in at least one side of the portion of the channel extending through each of the successive chambers to expose the inside of the channel to the atmosphere contained in the associated chambers;

a series of longitudinally slotted carriers supported in end-to-end engagement along the entire length of the channel, each of the carriers having at least one recessed surface thereon designed to support at least one article to be treated and expose areas of the article to the atmosphere contained in the chambers, the recessed surface on the carrier being sufficiently deep to prevent the article from projecting beyond the outer periphery of the carrier;

the edges of the apertures in the channels being chamfered to permit any particles of matter in the channel to fall from the channel into the bottom of the associated chambers and prevent jamming of the carriers in the channel;

a magazine for supplying carriers to the entrance end of the system;

means for feeding the carriers from the magazines through the system in end-to-end engagement, the feeding means including a pair of reciprocable gear racks mounted parallel to each other and to the longitudinal axis of the channel; the gear racks being mounted on opposite sides of the axis of the channel for reciprocation in opposite directions, the gear racks provided with gear teeth on the adjacent surfaces thereof; a hitch feed secured to each of the gear racks; a pawl secured to each of the hitch feeds designed to engage alternate carriers; a common pinion gear positioned between the racks in engagement with the gear teeth on the adjacent surfaces thereof; a reversible motor connected operatively to the pinion gear for rotating the pinion gear alternately in opposite directions and, thus, reciprocating the gear racks in opposite directions, and means for reversing the motor periodically so that, when one rack is retracted and, thus, the force exerted on a series of carriers extending the entire length of the channel is relieved, force will be exerted simultaneously on the series of carriers by the other rack; and horizontally extending rails projecting from the bottom and top of the channel designed to fit complementary-shaped slots in the bottom and top of the carriers to accurately align the carriers axially in the channel and provide uniform, restricted clearances between the sides of the carriers and inside surface of the channel, the restricted clearance insuring accurate control of leakage of gases into and out of the interconnected chambers and preventing any portions of the carriers which are exposed to the sputtering atmosphere from contacting any portion of the channel during the movement of the carriers through the system.

References Cited by the Examiner
UNITED STATES PATENTS

| | | | |
|---|---|---|---|
| 2,880,982 | 4/1959 | Kuhnapfel et al. | 263—6 |
| 2,907,480 | 10/1959 | Vincent | 214—175 |
| 3,057,130 | 10/1962 | Helwig | 53—86 |
| 3,057,792 | 10/1962 | Frohlich | 204—165 |
| 3,123,499 | 3/1964 | Tassara | 118—49 |
| 3,250,694 | 5/1966 | Maissel et al. | 204—192 |

JOHN H. MACK, *Primary Examiner.*

R. MIHALEK, *Assistant Examiner.*